US012602071B2

(12) United States Patent
Calkins et al.

(10) Patent No.: US 12,602,071 B2
(45) Date of Patent: Apr. 14, 2026

(54) VEHICLE PADS THAT EMULATE TRADITIONAL VEHICLE PEDALS AND INCLUDE MECHANICAL HYSTERESIS

(71) Applicant: CTS Corporation, Lisle, IL (US)

(72) Inventors: Scott Calkins, Elkhart, IN (US); XiaoXiao Lu, Granger, IN (US)

(73) Assignee: CTS Corporation, Lisle, IL (US)

( * ) Notice: Subject to any disclaimer, the term of this patent is extended or adjusted under 35 U.S.C. 154(b) by 169 days.

(21) Appl. No.: 18/483,893

(22) Filed: Oct. 10, 2023

(65) Prior Publication Data

US 2024/0131926 A1      Apr. 25, 2024

Related U.S. Application Data

(60) Provisional application No. 63/379,242, filed on Oct. 12, 2022.

(51) Int. Cl.
| | |
|---|---|
| *G05G 1/42* | (2008.04) |
| *B60K 26/02* | (2006.01) |
| *B60T 7/04* | (2006.01) |
| *G05G 1/44* | (2008.04) |

(52) U.S. Cl.
CPC ............. *G05G 1/42* (2013.01); *B60K 26/021* (2013.01); *B60T 7/042* (2013.01); *G05G 1/44* (2013.01)

(58) Field of Classification Search
CPC .. G05G 1/30; G05G 1/38; G05G 1/42; G05G 1/44; G05G 1/445; G01L 5/225; B60K 26/02; B60K 26/021; B60T 7/042
See application file for complete search history.

(56) References Cited

U.S. PATENT DOCUMENTS

| | | | |
|---|---|---|---|
| 5,233,882 | A | 8/1993 | Byram et al. |
| 6,364,046 | B1 * | 4/2002 | Forssell ................. G05G 1/323 |
| | | | 180/282 |
| 6,655,199 | B1 | 12/2003 | Smith |
| 7,926,384 | B2 | 4/2011 | Wurn |

(Continued)

FOREIGN PATENT DOCUMENTS

| | | |
|---|---|---|
| DE | 10347843 A1 | 4/2005 |
| EP | 0230722 A1 | 8/1987 |

(Continued)

OTHER PUBLICATIONS

International Search Report and Written Opinion for Application No. PCT/US2023/076444 dated Mar. 13, 2024 (14 pages).

(Continued)

*Primary Examiner* — Prasad V Gokhale
(74) *Attorney, Agent, or Firm* — Michael Best & Friedrich LLP

(57)      ABSTRACT

A pedal assembly for a vehicle that includes a foot pad, a pedal base, a flexible hinge that couples the foot pad to a first end of the pedal base, a sensor configured to sense a force exerted on the foot pad, and an electronic processor connected to the sensor. The electronic processor is configured to generate an output signal for controlling the vehicle based on a signal generated by the sensor and a model that defines a mechanical hysteresis effect. Another pedal assembly includes a prismatic joint that couples the foot pad to the pedal base. The prismatic joint enables linear displacement of the foot pad relative to the pedal base when a force is exerted on the foot pad.

18 Claims, 22 Drawing Sheets

(56) References Cited

U.S. PATENT DOCUMENTS

| | | | |
|---|---|---|---|
| 8,042,430 B2 | 10/2011 | Campbell | |
| 8,321,111 B2 | 11/2012 | Ueno et al. | |
| 8,522,640 B2 | 9/2013 | Bryce | |
| 8,806,977 B2 | 8/2014 | Stewart et al. | |
| 9,134,748 B2 | 9/2015 | Fujiwara | |
| 9,187,079 B2 | 11/2015 | Antao et al. | |
| 9,582,025 B2 | 2/2017 | Jayasuriya et al. | |
| 10,175,712 B2 | 1/2019 | Kaijala | |
| 10,860,047 B2 | 12/2020 | Kihara et al. | |
| 10,946,741 B1 * | 3/2021 | Kim | B60K 26/02 |
| 2004/0040408 A1 * | 3/2004 | Shaw | G05G 1/42 |
| | | | 74/560 |
| 2005/0217414 A1 | 10/2005 | Gibson | |
| 2007/0299593 A1 | 12/2007 | Karnjate et al. | |
| 2008/0184843 A1 | 8/2008 | Klotzbuecher et al. | |
| 2008/0306667 A1 | 12/2008 | Karnjate et al. | |
| 2010/0107805 A1 * | 5/2010 | Bryce | B60T 7/042 |
| | | | 74/519 |
| 2016/0031427 A1 | 2/2016 | Yasui et al. | |
| 2018/0283967 A1 * | 10/2018 | Kato | G05G 1/38 |
| 2020/0026321 A1 * | 1/2020 | Rühl | G05G 1/44 |
| 2021/0141411 A1 | 5/2021 | Kitagawa | |
| 2023/0202444 A1 | 6/2023 | Hokuto et al. | |
| 2023/0302898 A1 | 9/2023 | Calkins | |
| 2024/0300456 A1 | 9/2024 | Weschke | |

FOREIGN PATENT DOCUMENTS

| | | |
|---|---|---|
| EP | 2818444 A1 | 12/2014 |
| FR | 3007366 A1 | 12/2014 |
| JP | 2008222030 A | 9/2008 |
| WO | 2009087013 A1 | 7/2009 |
| WO | 2020142804 A1 | 7/2020 |

OTHER PUBLICATIONS

Wikipedia. Citreon C4. Version dated Feb. 6, 2022, available online at http://web.archive.org/web/20220206222153/https://en.wikipedia.org/wiki/Citro%C3%ABn_C4 (9 pages).

AutoCzescionline24.PL. Meat & Doria 83551 Pedal set. Webpage. Available at least as early as Feb. 1, 2022. Available online at https://www.autoczescionline24.pl/meat-doria-8124360.html. 26 pages with machine translation.

International Search Report and Written Opinion for Application No. PCT/US2023/016437 dated Jul. 04. 2023(16 pages).

* cited by examiner

VEHICLE PADS THAT EMULATE TRADITIONAL VEHICLE PEDALS AND INCLUDE MECHANICAL HYSTERESIS

RELATED APPLICATIONS

This application claims priority to U.S. Provisional application No. 63/379,242 filed Oct. 12, 2022, the disclosure of which is hereby incorporated by reference in its entirety.

FIELD

This present disclosure relates to a low displacement vehicle pad and, more specifically, to structures, systems, and method for emulating mechanical hysteresis in a low displacement vehicle pedal.

BACKGROUND

A traditional vehicle pedal system for automatic transmission vehicles includes an accelerator pedal and a brake pedal. Each pedal included in the system is attached to a metal or composite plastic arm, which in turn is connected to a hinge in such a way that when the user (driver) presses the pedal, the pedal moves, usually several inches over full range, to affect a response in the vehicle. In the case of an accelerator pedal, the vehicle in drive, moves forward and accelerates gradually or quickly depending on the throttle demand, which is solely a function of the position of the pedal in relation to the origin (as a result of the driver's exerted force). Conversely, when the driver desires to slow a vehicle that is in motion, the driver presses the brake pedal to slow the car. The rate at which the car slows is determined by the position of brake pedal in relation to its origin. The amount of time—typically tens to hundreds of milliseconds—between the time that the driver initially applies a force to a pedal and the time that the brake/accelerator pedal module (APM) controller confidently identifies the user demand is defined as the latency. This latency (measured in time) is a function of the underlying displacement resolution of the sensor (its ability to confidently resolve purposeful displacement from the absence of purposeful displacement).

In addition, some traditional vehicle pedal systems deploy purposeful hysteresis control schemes, which permit the driver to modulate the force of their demand, within bounds, to maintain the same throttle output, thereby reducing driver fatigue. Such vehicle pedal systems incorporate cooperating and engageable frictional members to generate a desired mechanical hysteresis effect in response to movement of the vehicle pedal. Examples of such vehicle pedal systems are disclosed in U.S. Pat. Nos. 7,926,384; 8,042,430; and 8,806,977, which are assigned to CTS Corporation. However, these mechanical hysteresis systems are not particularly suited or applicable for use with low displacement vehicle pedals, which operate in response to no or little movement of the pedal. Examples of such low displacement vehicle pedals are disclosed in U.S. Pat. No. 10,175,712, which is assigned to CTS Corporation.

SUMMARY

Aspects of the present disclosure are directed to systems and methods for emulating a mechanical hysteresis effect in a low displacement vehicle pedal that does not include a mechanical/frictional vehicle pedal hysteresis system.

One example provides a pedal assembly for a vehicle that includes a low displacement pedal, a sensor configured to sense a force exerted on the low displacement pedal, and an electronic processor connected to the sensor. The electronic processor is configured to determine a first output value, and receive a signal indicative of the force exerted on the low displacement pedal from the sensor. The electronic processor is also configured to determine a second output value based on the force exerted on the low displacement pedal, the first output value, and a model that defines a mechanical hysteresis effect and generate an output signal for controlling the vehicle, the second output signal corresponding to the second output value.

Another example provides a pedal assembly for a vehicle that includes a low displacement pedal, a sensor configured to sense a force exerted on the low displacement pedal, and an electronic processor connected to the sensor. The electronic processor is configured to determine a first output value. The electronic processor is also configured to determine a first threshold based on the first output value and a first parameter, receive a signal indicative of the force exerted on the low displacement pedal from the sensor, determine whether the force exerted on the low displacement pedal exceeds the first threshold, and determine a proposed output value when the force exerted on the low displacement pedal exceeds the first threshold. The electronic processor is also configured to determine whether the proposed output value exceeds a maximum output value, generate a first output signal for controlling the vehicle when the proposed output value does not exceed the maximum output value, the first output signal corresponding to the proposed output value, and generate a second output signal for controlling the vehicle when the proposed output value exceeds the maximum output value, the second output signal corresponding to the maximum output value.

Another example provides a method for emulating a mechanical hysteresis effect in a pedal assembly for a vehicle. The pedal assembly includes a low displacement pedal, a sensor configured to sense a force exerted on the low displacement vehicle, and an electronic processor connected to the sensor. The method includes determining, via the electronic processor, a first output value, determining, via the electronic processor, a first threshold based on the first output value and a first parameter, receiving, via the electronic processor a signal indicative of the force exerted on the low displacement pedal from the sensor, determining, via the electronic processor, whether the force exerted on the low displacement pedal exceeds the first threshold, and determining, via the electronic processor, a proposed output value when the force exerted on the low displacement pedal exceeds the first threshold. The method also includes determining, via the electronic processor, whether the proposed output value exceeds a maximum output value, generating, via the electronic processor, a first output signal for controlling the vehicle when the proposed output value does not exceed the maximum output value, the first output signal corresponding to the proposed output value, and generating, via the electronic processor, a second output signal for controlling the vehicle when the proposed output value exceeds the maximum output value, the second output signal corresponding to the maximum output value.

Another example provides a pedal assembly for a vehicle including a foot pad, a pedal base, and a flexible hinge that couples the foot pad to the pedal base, wherein the flexible hinge bends towards the pedal base when a force is exerted on the foot pad. The pedal assembly also includes a sensor configured to sense the force exerted on the foot pad and an electronic processor connected to the sensor, the electronic processor configured to generate an output signal for controlling the vehicle based on a signal generated by the sensor and a model that defines a mechanical hysteresis effect.

Another example provides a pedal assembly for a vehicle including a foot pad, a pedal base, and a prismatic joint that couples the foot pad to the pedal base, wherein the prismatic joint enables linear displacement of the foot pad relative to the pedal base when a force is exerted on the foot pad. The pedal assembly also includes a sensor configured to sense the force exerted on the foot pad and an electronic processor connected to the sensor, the electronic processor configured to generate an output signal for controlling the vehicle based on a signal generated by the sensor and a model that defines a mechanical hysteresis effect.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples, instances, and/or aspects of concepts that include the claimed subject matter, and explain various principles and advantages of examples, instances, and/or aspects.

Figure 1:
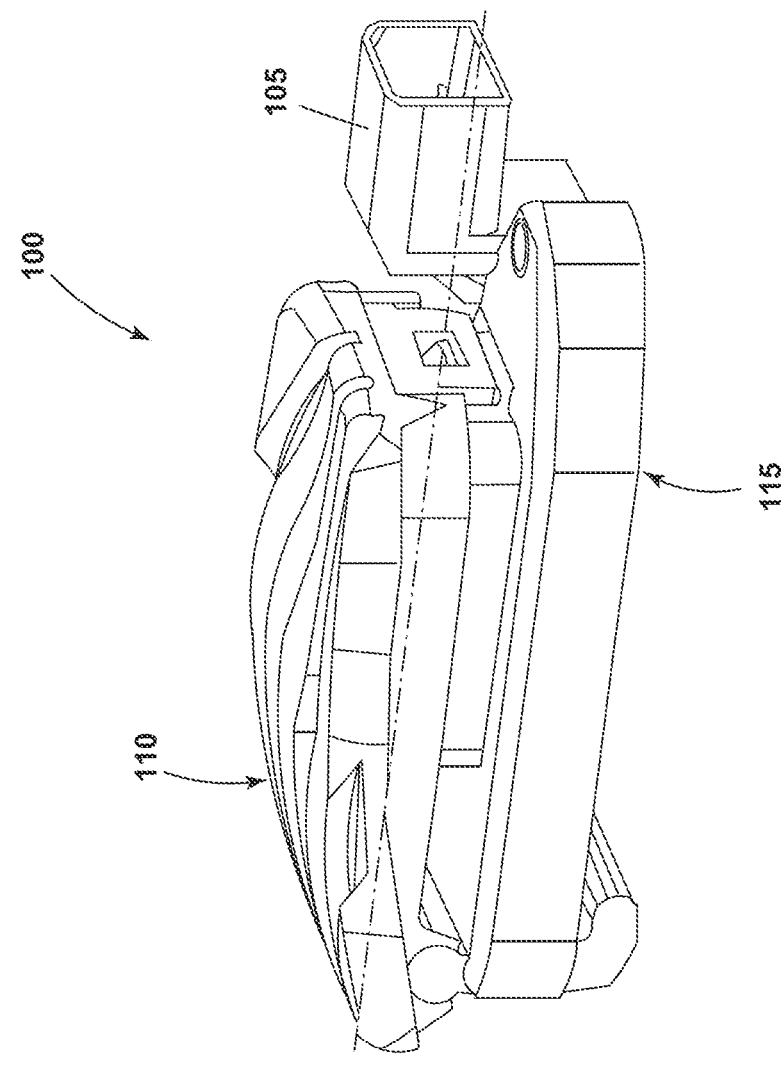
FIG. 1 is a perspective view of a low displacement vehicle pedal, according to one example.

The apparatus and method components have been represented where appropriate by conventional symbols in the drawings, showing only those specific details that are pertinent to understanding the examples, instances, and aspects illustrated so as not to obscure the disclosure with details that will be readily apparent to those of ordinary skill in the art having the benefit of the description herein.

DETAILED DESCRIPTION

One or more aspects are described and illustrated in the following description and accompanying drawings. These aspects are not limited to the specific details provided herein and may be modified in various ways. Furthermore, other aspects may exist that are not described herein. For example, a device or structure that is "configured" in a certain way is configured in at least that way but may also be configured in ways that are not listed. Furthermore, some aspects described herein may include one or more electronic processors configured to perform the described functionality by executing instructions stored in non-transitory, computer-readable medium. Similarly, aspects described herein may be implemented as non-transitory, computer-readable medium storing instructions executable by one or more electronic processors to perform the described functionality. As used in the present application, "non-transitory computer-readable medium" comprises all computer-readable media but does not include a transitory, propagating signal. Accordingly, non-transitory computer-readable medium may include, for example, a hard disk, a CD-ROM, an optical storage device, a magnetic storage device, ROM (Read Only Memory), RAM (Random Access Memory), register memory, a processor cache, other memory and storage devices, or combinations thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms, for example, first and second, top and bottom, and the like may be used herein solely to distinguish one entity or action from another entity or action without necessarily requiring or implying any actual such relationship or order between such entities or actions.

The systems and methods for emulating a mechanical hysteresis effect in a vehicle pedal of the present disclosure are, among other things, adapted for use with vehicle pedals that operate in response to little or no pivoting or movement of the vehicle pedal. Examples of such low displacement vehicle pedals are disclosed in U.S. Pat. No. 10,175,712, granted Jan. 8, 2019 and entitled "COMPACT VEHICLE PEDAL," the entire content of which is hereby incorporated by reference and reproduced in part below. In some aspects, systems and methods for emulating a mechanical hysteresis effect in a vehicle pedal of the present disclosure are adapted for use with other types of low displacement vehicle pedals, such as electronic pads (ePads). Electronic pads eliminate a need for pedal arms, rubber or molded plastic pedal covers, and traditional hinges and/or pivots thereby providing additional space for the driver's feet and legs. The displacement of the electronic pad can be extremely minimal, such as in the range of 0.001-2 millimeters, yet still create the force necessary for a sensor, such as a strain gauge, to activate acceleration and/or braking. Of course, the displacement could be more in order to give the driver a more traditional sense and feel of the traditional vehicle pedal systems, and the aspects described herein includes electronic vehicle pads that may operate across a variety of displacement range.

In addition, electronic pads improve the latency time of the brake/APM controller when compared to traditional vehicle pedal systems. For example, in the field of sensors/controls, transducing systems with smaller ranges of motion and correspondingly smaller displacement resolution yield shorter latency times than transducer systems with larger ranges of motion. Thus, since the displacement of the electronic pad is significantly reduced in comparison to the displacement of a vehicle pedal included in a traditional pedal system, the response time of a system including an electronic pad is quicker than the response time of a traditional vehicle pedal system, which can be as large as hundreds of milliseconds.

Figure 2:
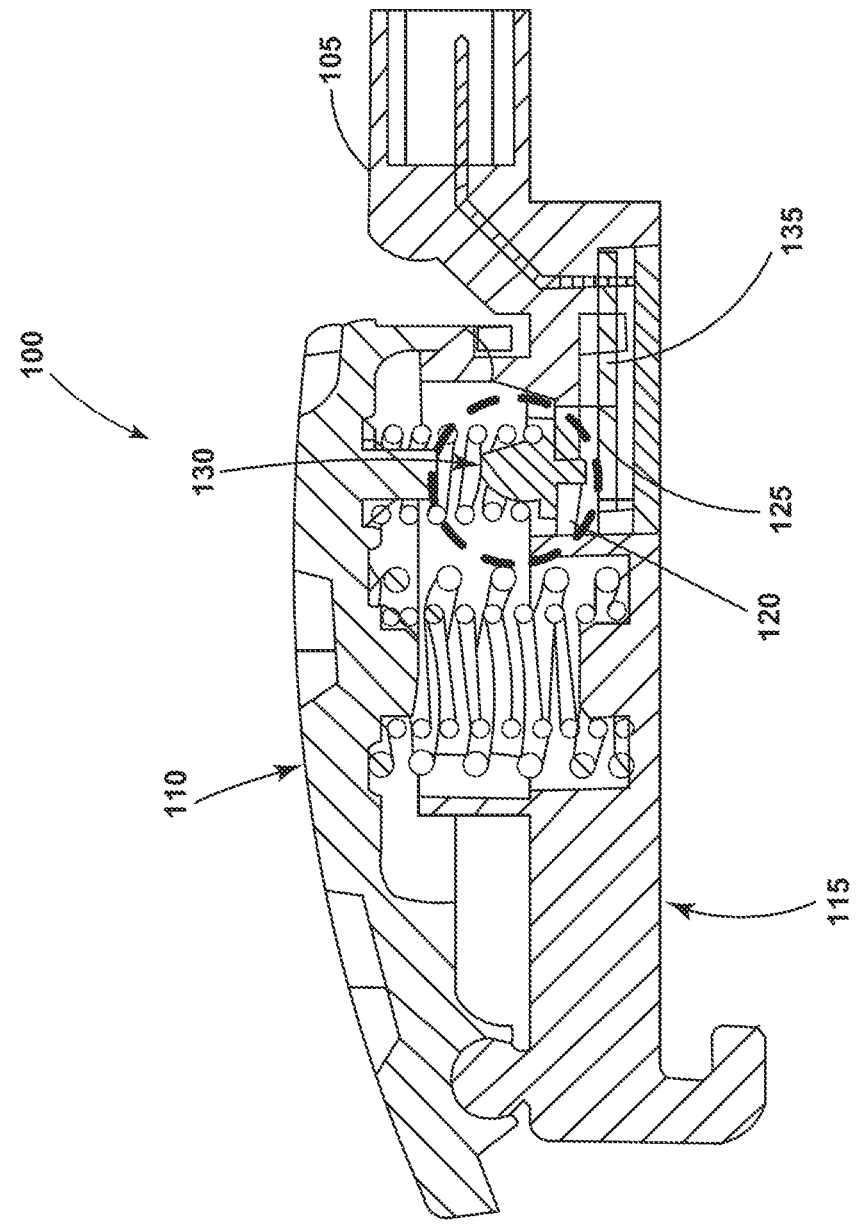
FIG. 2 is a vertical cross-section of the low displacement vehicle pedal of FIG. 1 in its idle position, according to one example.
Figure 3:
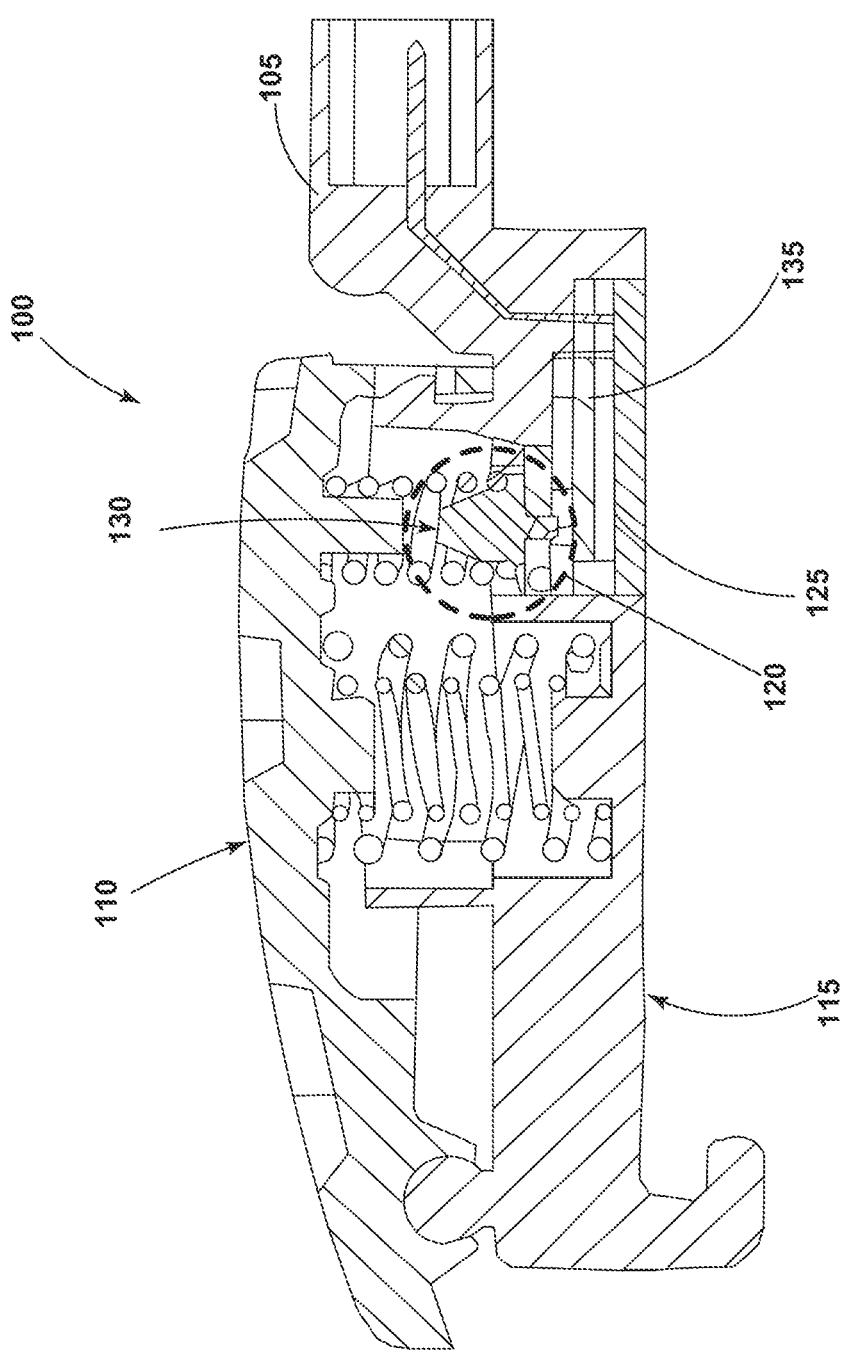
FIG. 3 is a vertical cross-section of the low displacement vehicle pedal of FIG. 1 in its engaged position, according to one example.

FIGS. 1-3 illustrate an example low displacement vehicle pedal assembly, or pedal, 100 that is adapted for use with systems and methods of the present disclosure for emulating a mechanical hysteresis effect in a low displacement vehicle pedal. The pedal 100 is included in and operatively connected to a vehicle (not shown). In the illustrated example, the pedal 100 includes a connector 105 that is configured to electrically and operatively connect the pedal 100 to a bus system of the vehicle and/or a control unit included in the vehicle. In some instances, the vehicle is a passenger vehicle, such as a car or a light truck. In some instances, the vehicle is a commercial vehicle, such as a van, a bus, a box truck, or a semi-truck. In some instances, the vehicle is a small vehicle such as a motorcycle, a scooter, or an all-terrain vehicle. In some instances, the vehicle is a low-speed vehicle such as a golf cart or a utility cart. In some instances, the vehicle is powered by an internal combustion engine. In some instances, the vehicle is an electric vehicle. In some instances, the pedal 100 is included in and connected to other types of vehicles.

The pedal 100 also includes, among other things, a pedal arm 110 that is pivotally secured to a pedal base 115 mounted to, or otherwise coupled to, the vehicle floor (not shown). The pedal arm 110 is generally flat and arranged to engage a foot of the driver of the vehicle. When a driver exerts a pressing force on the pedal arm 110, the pedal arm 110 experiences very little displacement relative to the pedal base 115. As shown in FIGS. 2 and 3, the pedal 100 also includes a sensor 120 that is configured to sense a force exerted on the pedal arm 110 by the driver. As will be described in more detail below, a control unit of the vehicle is configured to control a power output of the vehicle based on the force sensed, or measured, by the sensor 120.

In the illustrated example of FIGS. 2 and 3, the sensor 120 includes a strain gauge 125 and an actuator 130. The strain gauge 125 includes, for example, electrically resistive strip elements or resistors (not shown) that are arranged in a bridge circuit configuration and mounted on the strain gauge. The actuator 130 is arranged to abut against a surface of the strain gauge 125. In some instances, the sensor 120 is electrically connected to a printed circuit board (PCB) 135 included in the pedal 100.

FIG. 2 illustrates the pedal arm 110 in an idle (e.g., no braking/acceleration) position and FIG. 3 illustrates the pedal arm 110 in an engaged (e.g., accelerating/braking) position. When a driver presses the pedal arm 110 in the direction of the pedal base 115 from the idle position to the engaged position, the pedal arm 110 causes the actuator 130 to exert a force against a surface of the strain gauge 125. The force exerted on strain gauge 125 results in a deflection or bending of the strain gauge 125, which in turn results in a change in the characteristics of the electrically resistive elements (not shown) formed or mounted on the strain gauge 125. This change in resistance of the strain gauge 125 causes the sensor 120 to generate an electrical signal that is indicative of an amount of force exerted by the driver onto the pedal arm 110, and more generally, the amount of force exerted on the pedal 100. As will be described in more detail below, a controller is configured to generate, based in part on the electrical signal generated by the sensor 120, an output signal for driving the vehicle in accordance with mechanical hysteresis emulation systems and methods described herein.

It should be understood that the sensor 120 is not limited in implementation to the sensor that is illustrated in FIGS. 2 and 3 and described above. That is, although the sensor 120 is illustrated and described above as including a strain gauge 125 and an actuator 130, in some instances, the sensor 120 is implemented as a different type of sensor. For example, in some instances, the sensor 120 is implemented as a non-contacting sensor, such as a Hall Effect sensor. As another example, in some instances, the sensor 120 is implemented as a contacting resistive potentiometric sensor. In some instances, the sensor 120 is implemented as another type of sensor that is not explicitly described herein. However, regardless of which type of sensor is used to implement the sensor 120, the sensor 120 is configured to generate an electrical signal that is indicative of an amount of force exerted by the driver onto the pedal 100.

Figure 4:
FIG. 4 is a block diagram of a control system for a low displacement vehicle pedal assembly, according to one example.
Figure 4:
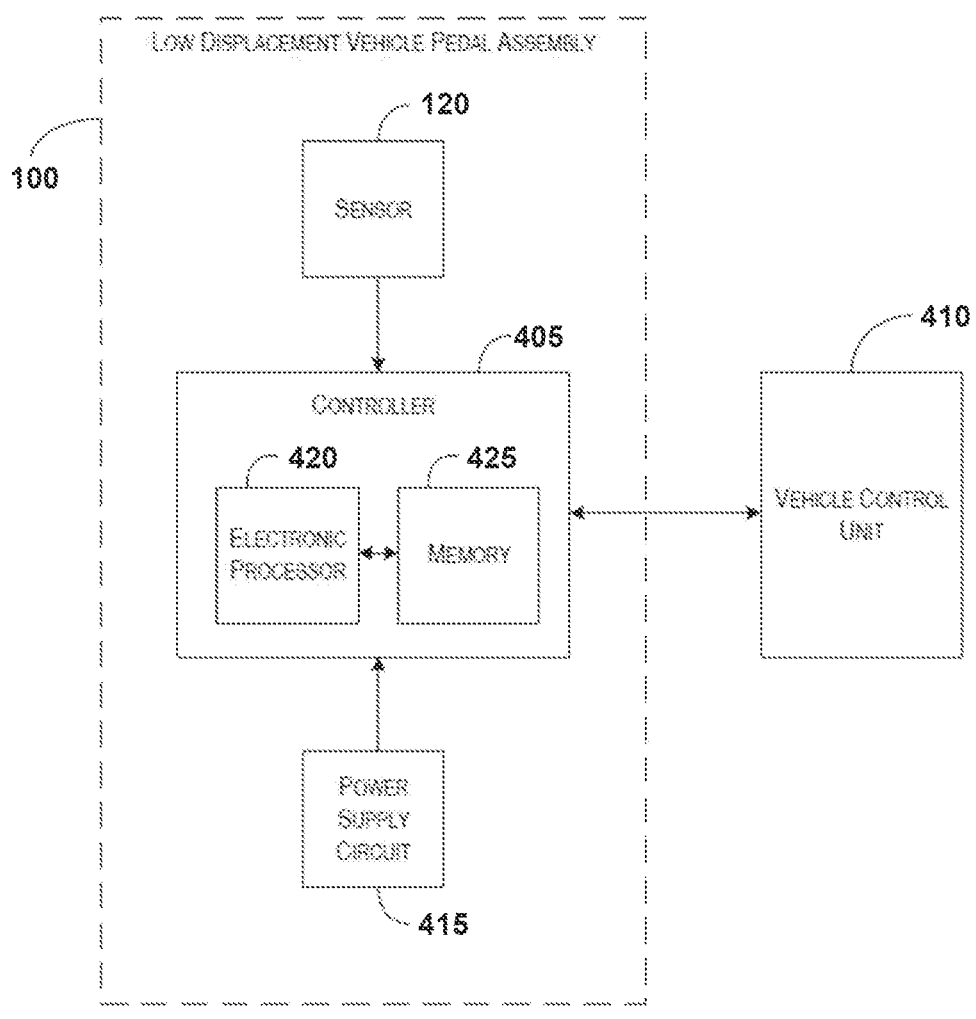
Figure 5:
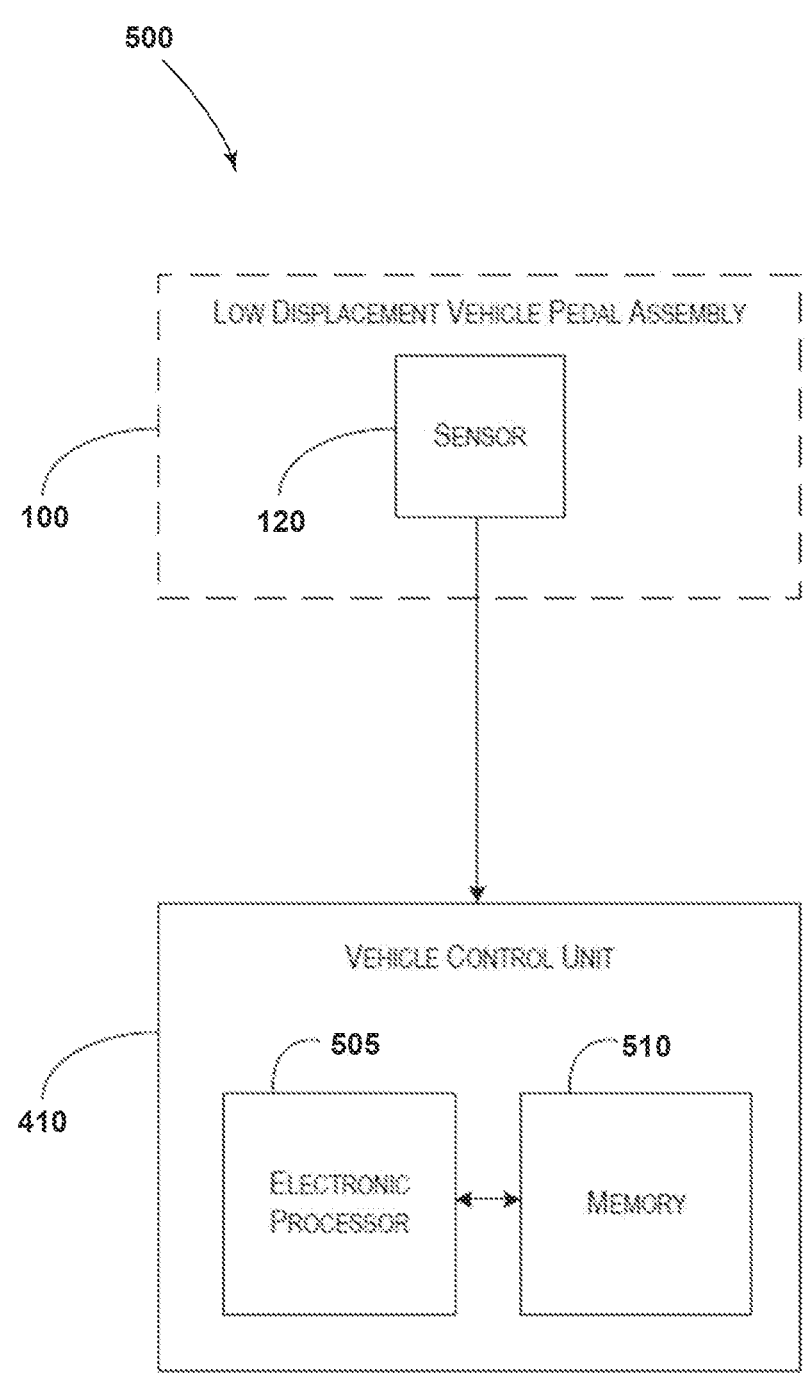
FIG. 5 is a block diagram of a control system for a low displacement vehicle pedal assembly, according to another example.

FIG. 4 illustrates a block diagram of an example control system 400 of the low displacement pedal assembly 100 according to some aspects of the present disclosure. The control system 400 includes the sensor 120, a controller 405 that is electrically connected to the sensor 120, and a vehicle control unit (e.g., engine control unit (ECU) motor control unit (MCU), a brake control unit, etc.) 410 that is electrically connected to the controller 405. As shown in FIG. 4, the controller 405 is contained within a body, or housing, of the low displacement vehicle pedal assembly 100. For example, in some instances, the controller 405 is mounted to and/or electrically connected to the PCB 135 included in the pedal 100. However, in other instances, the low displacement vehicle pedal assembly 100 does not include its own controller. In such instances, the functionality described herein with respect to controller 405 is performed by the vehicle control unit 410. As will be described in more detail below, FIG. 5 illustrates an example control system 500 for the low displacement vehicle pedal assembly 100 in which the vehicle control unit 410 is configured to perform the functions that are described herein as being performed by one or more components of the controller 405 included in the pedal 100.

The controller 405 shown in FIG. 4 includes a plurality of electrical and electronic components that provide power, operational control, and protection to the components and modules within controller 405. For example, in some instances, the controller 405 includes a power supply circuit 415 that provides operational power from a source (e.g., a battery) to components of the controller 405 and/or the sensor 120. In some instances, the controller 405 includes converter circuitry, such as an analog-to-digital converter (not shown), for processing signals received from the sensor 120. Furthermore, the controller 405 includes an electronic processor 420 (for example, an application specific integrated circuit (ASIC), a programmable microprocessor, a microcontroller, programmable logic controller, or other suitable device) and a memory 425.

The memory 425 is a non-transitory computer readable medium that includes, for example, a program storage area and a data storage area. The program storage area and the data storage area can include combinations of different types of memory, for example one or more registers, read-only memory ("ROM"), random access memory ("RAM") (for example, dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. In one example, the electronic processor 420 is connected to the memory 425 and executes software instructions that are capable of being stored in a RAM of the memory 425 (for example, during execution), a ROM of the memory 425 (for example, on a generally permanent basis), or another non-transitory computer-readable medium. In some instances, software used for emulating the mechanical hysteresis effect of a vehicle pedal is stored in the memory 425. The software includes, for example, firmware, one or more applications, program data, filters, rules, one or more program modules, and other executable instructions. The electronic processor 420 is configured to retrieve from the memory 425 and execute, among other things, instructions related to the control processes and methods described herein. In another example, the electronic processor 420 is an ASIC that is configured to execute a logic function according to data stored in one or more registers of electronic processor 420. In some constructions, the controller 405 includes additional, fewer, or different components.

As described above, in some instances, the low displacement vehicle pedal assembly 100 does not include its own controller. For example, FIG. 5 illustrates a block diagram of a control system 500 in which the low displacement vehicle pedal assembly 100 does not include its own controller. As shown, the sensor 120 included in the pedal 100 is electrically connected directly to a controller in the vehicle, such as vehicle control unit 410, that is located outside of a body, or housing, of the pedal 100. In such instances, the vehicle control unit 410 includes an electronic processor 505 that is configured to execute software that is store in memory 510 and used for emulating the mechanical hysteresis effect of a vehicle pedal.

It should be understood that in some instances, the electronic processor 505 and the memory 510 are similar in implementation and/or operation to the electronic processor 420 and the memory 425 described above. Moreover, it should be understood that in some instances, the vehicle control unit 410, the electronic processor 505, and/or the memory 510 are configured to perform the functions that are described herein as being performed by the controller 405, the electronic processor 420, and/or the memory 425. Accordingly, functions described herein as being performed by the controller 405, the electronic processor 420 and/or the memory 425 included in the vehicle pedal assembly 100 may also be performed by the vehicle control unit 410, the electronic processor 505, and/or the memory 510.

The controller 405 shown in FIG. 4 is configured to receive, from the sensor 120, an electrical signal indicative of an amount of force exerted on the pedal 100. The controller 405 is also configured to determine the amount of force exerted on the pedal 100 based on the received signal and generate an output signal for controlling the vehicle according to an emulated mechanical hysteresis effect. For example, the controller 405 is configured to generate and provide an output signal to the vehicle control unit 410 for controlling a drive power output and/or a braking power output of the vehicle according to the emulated mechanical hysteresis effect. In some instances, the vehicle control unit 410 is an ECU that is configured to control the power output of an engine (not shown) based on the output signal received from the controller 405. In some instances, the vehicle control unit 410 is an MCU that is configured to control the power output of a motor (not shown) based on the output signal received from the controller 405. In some instances, the vehicle control unit 410 is a brake controller that is configured to control operation of a brake (not shown) based on the output signal received from the controller 405.

Persons skilled in the art should appreciate that in some instances, generating an output signal for controlling the vehicle and providing the output signal to the vehicle control unit 410 includes generating and providing at least two copies of the output signal to the vehicle control unit 410. In such instances, two copies of the same output signal are generated by the controller 405 and provided to the vehicle control unit 410 to increase reliability of the pedal 100. That is, the redundant output signals generated by the controller 405 and provided to the vehicle control unit 410 reduce the chances of the occurrence of an error that causes inaccurate control of the vehicle. Accordingly, although output signals generated by the pedal 100 for controlling the vehicle are described herein as being a single output signal, it should be understood that in some instances, description of generating and providing a single output signal to the vehicle control unit 410 is also applicable to instances in which one or more redundant copies of the output signal are generated and provided to the vehicle control unit 410.

Figure 6:
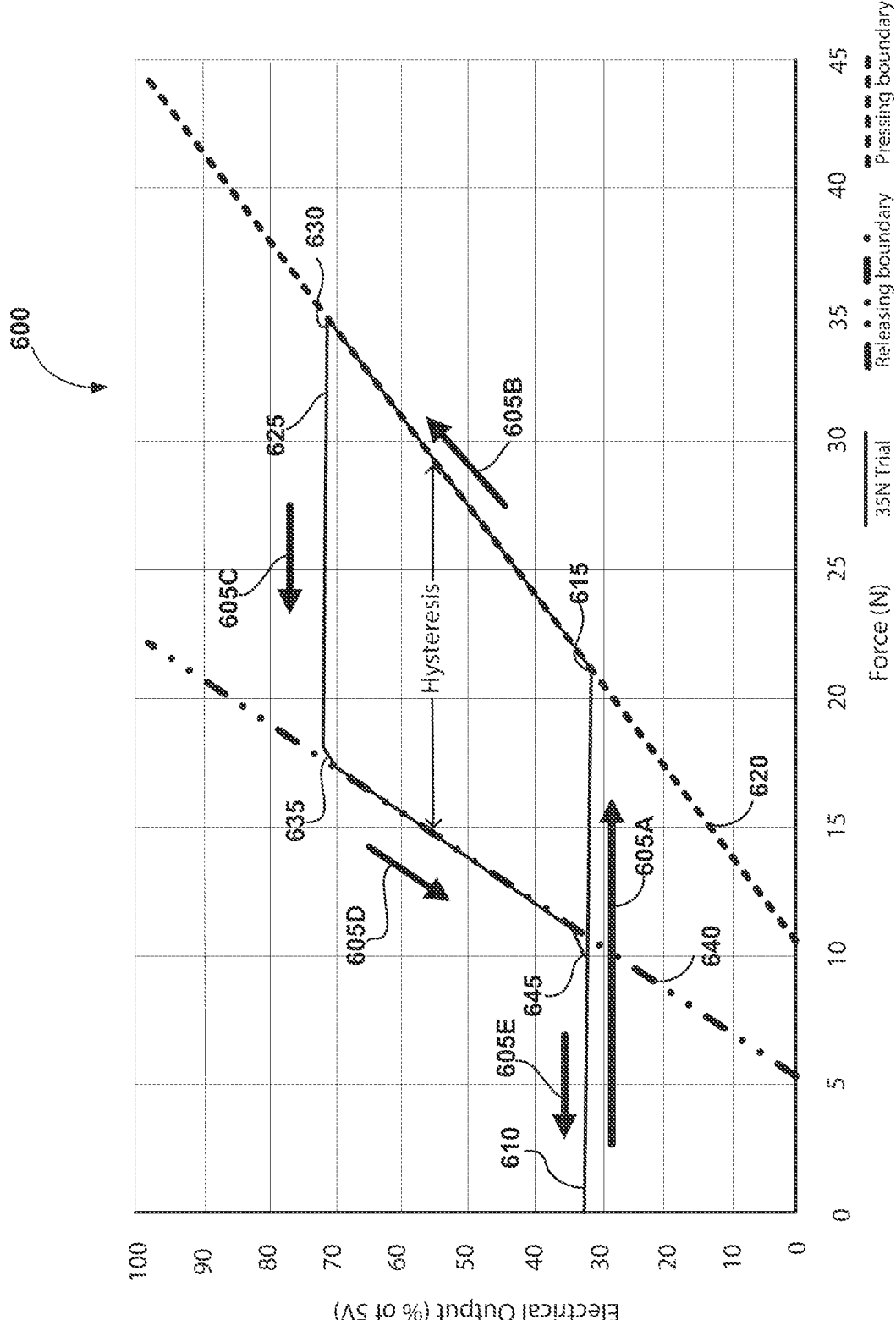
FIG. 6 is a graph illustrating a mechanical hysteresis effect to be emulated by the low displacement vehicle pedal of FIG. 1, according to one example.

FIG. 6 illustrates an example mechanical hysteresis effect 600, which is modeled as a hysteresis loop or window. As described above, the controller 405 is configured to emulate the mechanical hysteresis effect 600 during operation of the vehicle. In the illustrated example, the mechanical hysteresis effect 600 is represented as a relationship between the force exerted on the pedal 100 and a value of the output signal generated by the controller 405. More particularly, the mechanical hysteresis effect 600 is a function of the force exerted on the pedal 100 by a driver of the vehicle. In operation, the controller 405 generates an output signal for controlling the output power (e.g., driving power or braking power) of the vehicle in accordance with emulating the mechanical hysteresis effect 600. It should be understood that numerical values illustrated in FIG. 6 are provided merely as examples and that other implementation may use values that are different from the ones shown.

In the illustrated example, a value of the output signal generated by the controller 405 is a percentage of an operating voltage (e.g., 5 V) of the controller 405. For example, the controller 405 is configured to generate an output signal having a voltage value that is a first percentage (e.g., 30%) of the operating voltage of controller 405 when a first force (e.g., 0 N) is exerted on the pedal 100. In such an example, the output signal is provided to the vehicle control unit 410, which is configured to control the output power of the vehicle according to the voltage value of the output signal. As another example, the controller 405 is configured to generate an output signal having a voltage value that is a different percentage (e.g., 70%) of the voltage of controller 405 when the force exerted on the pedal 100 changes (e.g., when the force is increased to 35 N). In such an example, the output signal is provided to the vehicle control unit 410, which is configured to control the output power of the vehicle according to the voltage value of the output signal.

However, it should be understood that in some instances, the value of the output signal does not correspond to a percentage of the operating voltage of controller 405. For example, in some instances, the output signal is a digital signal that includes data indicative of a target output of the vehicle. In such an example, the output signal is provided to the vehicle control unit 410, which is configured to control the output power of the vehicle according to the data included in the output signal. In some instances, the output signal is implemented in other ways.

With reference to FIG. 6, arrows 605A-605E are illustrated to assist with explaining the mechanical hysteresis effect 600 that is emulated by the controller 405. As shown, when little to no force is exerted on the pedal 100 (e.g., at vehicle start-up or when the vehicle is idling), the controller 405 is generates an output signal that has a minimum output value 610. In the illustrated example, the minimum output value 610 is 30% of the voltage of controller 405. However, in some instances, the minimum output value 610 is a different value. In some instances, the minimum output value 610 is a predetermined value that is stored in memory 425. In some instances, the minimum output value 610 is configurable.

When the force exerted on the pedal 100 increases from zero (e.g., the driver increases a pressing force exerted on the pedal arm 110) as indicated by arrow 605A, the value of an output signal generated by the controller 405 remains at the minimum output value 610 until the force exerted on the pedal 100 is increased to a first value, such as the pressing force threshold 615 (e.g., 21 N). The pressing force threshold 615 is a force value that intersects a pressing boundary 620 included in the model of the mechanical hysteresis effect 600. In some instances, the pressing force threshold 615 is a function of the value of the most recent output signal generated by the controller 405. For example, when the pressing boundary 620 or first boundary is modeled as a linear function, such as the pressing boundary 620 shown in FIG. 6, an expression for determining the pressing force threshold 615 is represented by Equation 1:

$$\text{Pressing Force Threshold} = \frac{\text{Current\_Output} - \text{Pressing\_B}}{\text{Pressing\_M}} \qquad \text{[Equation 1]}$$

The controller 405 is configured to use Equation 1 to determine a value of the pressing force threshold 615. With respect to Equation 1, Current Output, or the current output value, is a value of the most recent output signal generated by controller 405. In some instances, the value of the most recent output signal generated by controller 405 is stored in one or more registers of the electronic processor 420. In other instances, the value of the most recent output signal generated by controller 405 is stored in the memory 425, such as in the RAM included in memory 425. Pressing_B is a value that represents an offset of the pressing boundary 620. In some instances, the value of Pressing_B is a predetermined value that is stored in memory 425. In some instances, the value of Pressing_B is configurable. Pressing_M is a rate of change of a first function, or slope, of the pressing boundary 620 or first boundary. In some instances, the value of Pressing_M is a predetermined value that is stored in memory 425. In some instances, the value of Pressing_M is configurable.

As described above, Equation 1 is used for determining a value of the pressing force threshold 615 for instances in which the pressing boundary 620 is modeled as a linear function. However, it should be understood that different equations and/or methods for determining the pressing force threshold 615 are used for instances in which the pressing boundary 620 is not modeled as a linear function. For example, the controller 405 uses a different equation to determine the pressing force threshold 615 when the pressing boundary 620 is modeled as a different type of function (e.g., a quadratic function, a logarithmic function, an exponential function, a table-valued function, a step function, etc.).

When the value of the force exerted on the pedal 100 increases past the pressing force threshold 615, as indicated by arrow 605B, a value of the output signal generated by the controller 405 is determined in accordance with the pressing boundary 620. As shown, the pressing boundary 620 defines a portion of the window, or loop, of the mechanical hysteresis effect 600 that is emulated by controller 405. Furthermore, the pressing boundary 620 a function of the force exerted on the pedal 100. The function that defines the pressing boundary 620 can be used by the controller 405 to determine a value of the output signal provided to the vehicle control unit 410. In the illustrated example, the pressing boundary 620 is a linear function that is expressed by Equation 2:

Output Value=(Current_Output*Pressing_*M*)+Press-
ing_*B*     [Equation 2]

Although the pressing boundary 620 is illustrated in FIG. 6 and expressed as a linear function in Equation 2, it should be understood that in some instances, the pressing boundary 620 is modeled as a different type of equation that defines the mechanical hysteresis effect 600 emulated by controller 405. For example, in some instances, the pressing boundary 620 is modeled as one or more of a quadratic function, a logarithmic function, an exponential function, a table-valued function, a step function, and/or other suitable mathematical function.

As described above, the controller 405 is configured to use Equation 2 to determine a value of the output signal when the force exerted on the pedal 100 increases past the pressing force threshold 615. However, in some instances, the value of the output signal generated by controller 405 is prevented from exceeding a maximum output value 625. That is, even if the force exerted on the pedal 100, and correspondingly, the output value determined by the controller 405 continues to increase, the value of an output signal generated by controller 405 does not exceed the maximum output value 625. In some instances, the maximum output value 625 is a predetermined value that is stored in memory 425. In some instances, the maximum output value 625 is configurable.

With respect to the illustrated example of FIG. 6, if the force exerted on the pedal 100 is equal to 40 N, the controller 405 is configured to use Equation 2 to determine an output value that would be approximately equal to 85% of the operating voltage of the controller 405. However, as shown, the maximum output value 625 is approximately 71.5% of the operating voltage of the controller 405. Thus, the controller 405 is also configured to determine that the output value (e.g., 85%) that was determined using Equation 2 exceeds the maximum output value 625. The controller 405 generates an output signal having a value that is equal to the maximum output value 625 (e.g., 71.5%), not the determined output value (e.g., 85%) that exceeds the maximum output value 625.

As further shown in the illustrated example of FIG. 6, in some instances, the maximum output value 625 corresponds to a maximum pressing force threshold 630. In the illustrated example, the maximum pressing force threshold 630 is 35 N. When the force exerted on the pedal 100 increases past the maximum pressing force threshold 630 (e.g., 35 N), a value of the output signal generated by controller 405 is set to the maximum output value 625 (e.g., 71.5%). In some instances, the controller 405 is configured to determine a value of the maximum pressing force threshold 630 using a function of the value of the most recent output signal generated by controller 405. In some instances, the maximum pressing force threshold 630 is a predetermined value that is stored in memory 425. In some instances, the value of the maximum pressing force threshold 630 is configurable.

Referring again to the illustrated example of FIG. 6, arrow 605C indicates an instance in which the force exerted on the pedal 100 is decreased from the maximum pressing force threshold 630 (e.g., the driver of the vehicle reduces a force exerted on and/or releases the pedal 100). When the force exerted on the pedal 100 is decrease from the maximum pressing force threshold 630, the value of an output signal generated by the controller 405 remains at the maximum output value 625 until the force exerted on the pedal 100 is decreased to a second value, such as the releasing force threshold 635 (e.g., approximately 17 N). By maintaining the value of an output signal generated by the controller 405 at the maximum output value 625, even as the force exerted on the pedal 100 slightly decreases, a driver of the vehicle is not required to sustain exertion of an exact amount of force on the pedal 100 to operate the vehicle at a constant speed or braking pressure. Rather, when the driver of the vehicle exerts a force on the pedal 100 that lies within the range between the maximum pressing force threshold 630 and the releasing force threshold 635, the controller 405 maintains the value of generated output signal at the maximum output value 625.

Similar to the pressing force threshold 615, the releasing force threshold 635 is a force value that intersects a releasing boundary 640 included in the model of the mechanical hysteresis effect 600. In some instances, the releasing force threshold 635 is a function of the most recent value of the output signal generated by the controller 405. For example, when the releasing boundary 640 is modeled as a linear function, such as the releasing boundary 640 shown in FIG. 6, an expression for determining the releasing force threshold 635 is represented by Equation 3:

$$\text{Releasing Force Threshold} = \frac{\text{Current\_Ouput} - \text{Releasing\_B}}{\text{Releasing\_M}} \qquad \text{[Equation 3]}$$

In operation, the controller 405 is configured to use Equation 3 to determine a value of the releasing force threshold 635. With respect to Equation 3, Current Output, or the current output value, is a value of the most recent output signal generated by controller 405. In some instances, the value of the most recent output signal generated by controller 405 is stored in one or more registers of the electronic processor 420. In other instances, the value of the most recent output signal generated by controller 405 is stored in the memory 425, such as in the RAM included in memory 425. Releasing_B is a value that represents an offset of the releasing boundary 640. In some instances, the value of Releasing_B is a predetermined value that is stored in memory 425. In some instances, the value of Releasing_B is configurable. Releasing_M is a rate of change of a second function, or slope, of the releasing boundary 640 that defines a second boundary. In some instances, the value of Releasing_M is a predetermined value that is stored in memory 425. In some instances, the value of Releasing_M is configurable.

As described above, Equation 3 is used for determining a value of the releasing force threshold 635 for instances in which the releasing boundary 640 is modeled as a linear function. However, it should be understood that different equations and/or methods for determining the releasing force threshold 635 are used for instances in which the releasing boundary 640 is not modeled as a linear function. For example, the controller 405 is configured to use a different equation to determine the releasing force threshold 635 when the releasing boundary 640 is modeled as a different type of function (e.g., a quadratic function, a logarithmic function, an exponential function, a table-valued function, a step function etc.).

When the value of the force exerted on the pedal 100 decreases past the releasing force threshold 635, as indicated by arrow 605D, a value of the output signal generated by the controller 405 is determined in accordance with the releasing boundary 640. As shown, the releasing boundary 640 defines a portion of the window, or loop, of the mechanical hysteresis effect 600 that is emulated by the controller 405. In addition, the releasing boundary 640 is a function of the force exerted on the pedal 100. The function that defines the releasing boundary 640 can be used by the controller 405 to determine a value of the output signal provided to the vehicle control unit 410. In the illustrated example, the releasing boundary 640 is a linear function that is expressed by Equation 4:

$$\text{Output Value}=(\text{Current\_Output}*\text{Releasing\_}M)+\text{Releasing\_}B \qquad \text{[Equation 4]}$$

Although the releasing boundary 640 is illustrated in FIG. 6 and expressed as a linear function, it should be understood that in some instances, the releasing boundary 640 is modeled as a different type of equation that defines the emulated mechanical hysteresis effect 600. For example, in some instances, the releasing boundary 640 is modeled as one or more of a quadratic function, a logarithmic function, an exponential function, a table-valued function, a step function, and/or other suitable mathematical function.

As described above, the controller 405 is configured to use Equation 4 to determine a value of the output signal when the force exerted on the pedal 100 decreases past the releasing force threshold 635. However, in some instances, the value of the output signal generated by controller 405 is prevented from decreasing below the minimum output value 610. That is, even if the force exerted on the pedal 100, and correspondingly, the proposed value determined by the controller 405 continues to decrease, the value of an output signal generated by controller 405 shall not be less than the minimum output value 610.

With respect to the illustrated example of FIG. 6, if the force exerted on the pedal 100 is decreased to 5 N, the controller 405 uses Equation 4 to determine an output value that would be approximately equal to 0% of the operating voltage of the controller 405. However, as shown, the minimum output value 610 is approximately 30% of the voltage of the controller 405. Thus, the controller 405 is also determines that the output value (e.g., 0%) that was determined using Equation 4 is less than the minimum output value 610. Accordingly, the controller 405 generates an output signal having a value that is equal to the minimum output value 610 (e.g., 30%), not the determined output value (e.g., 0%) that is less than the minimum output value 610.

As further shown in the illustrated example of FIG. 6, in some instances, the minimum output value 610 corresponds to a minimum releasing force threshold 645. In the illustrated example, the minimum releasing force threshold 645 is approximately 10 N. When the force exerted on the pedal 100 decreases past the minimum releasing force threshold 645 (e.g., 10 N) as indicated by arrow 605E, a value of the output signal generated by controller 405 is set to the minimum output value 610 (e.g., 30%). In some instances, the controller 405 is configured to determine a value of the minimum releasing force threshold 645 as function of the value of the most recent output signal generated by controller 405. In some instances, the minimum releasing force threshold 645 is a predetermined value that is stored in memory 425. In some instances, the value of the minimum releasing force threshold 645 is configurable.

Although the above-described functions associated with emulating the mechanical hysteresis effect 600 are generally described as being performed by the controller 405 included in the low displacement vehicle pedal assembly 100, it should be understood that in some instances, one or more of those above-described functions are performed by the electronic processor 420 and/or the memory 425. Moreover, it should be understood that it in some instances, one or more of those above-described functions associated with emulating the mechanical hysteresis effect 600 are performed by the vehicle control unit 410, the electronic processor 505 included in the vehicle control unit 410, and/or the memory 510 included in the vehicle control unit 410.

Figure 7:
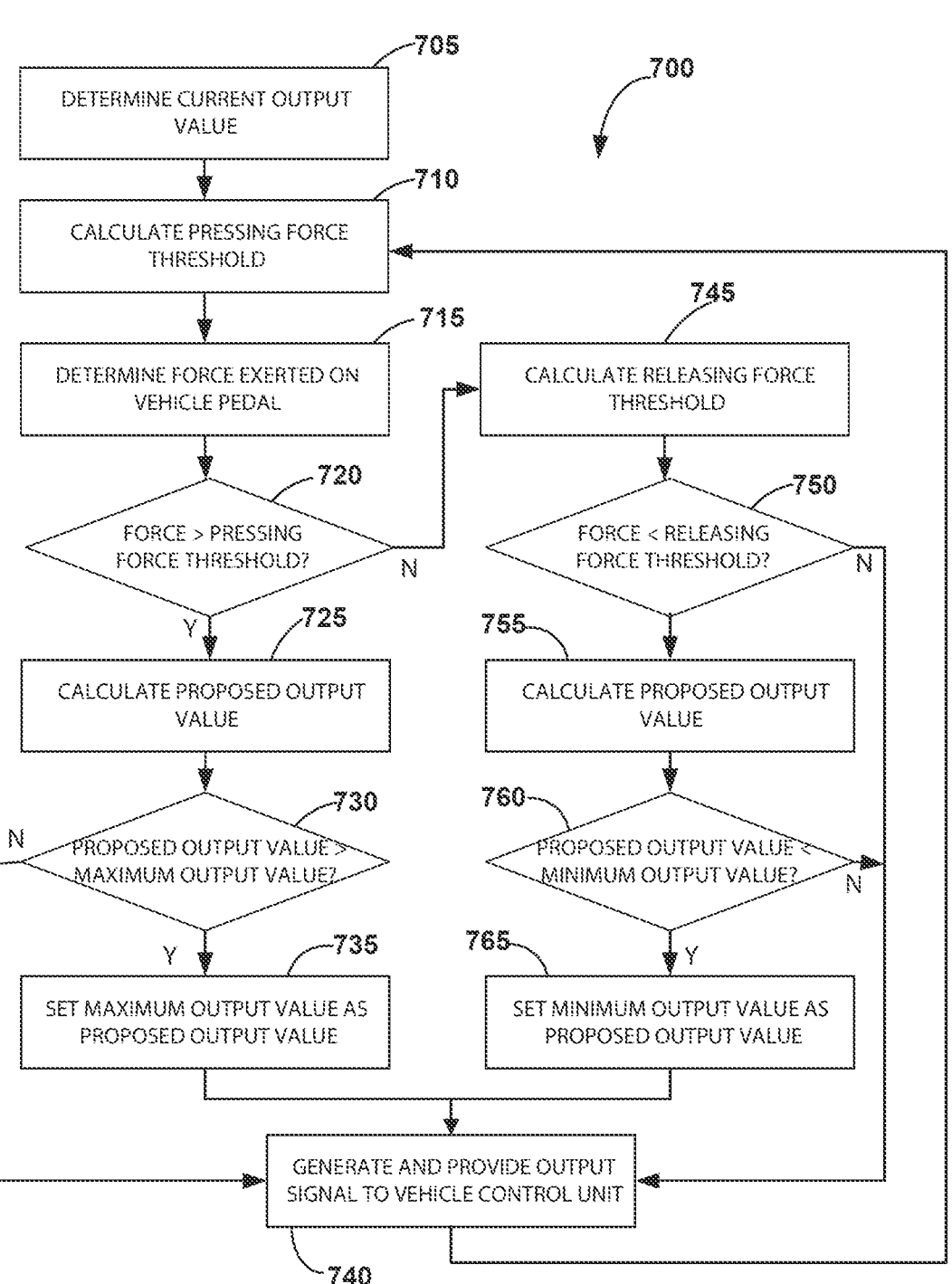
FIG. 7 is a block diagram of a method for emulating a mechanical hysteresis effect in a low displacement vehicle pedal, according to one example.

FIG. 7 illustrates one example method 700 of emulating a mechanical hysteresis effect in a low displacement vehicle pedal assembly, such as the pedal 100. The method 700 is described as being executed in part by the controller 405. However, in some examples, some aspects of the method 700 are performed by the sensor 120, the electronic processor 420 included in the controller 405, and/or the memory 425 included in the controller 405. Likewise, in other examples, some aspects of the method 700 are performed by the sensor 120, the vehicle control unit 410, the electronic processor 505 included in the vehicle control unit 410, and/or the memory 510 included in the vehicle control unit 410.

At block 705, the controller 405 determines a current output value, which is the value of the of the most recent output signal that was generated and provided to the vehicle control unit 410. As described above, the current output value is indicative of a current power output of the vehicle. In some instances, the controller 405 is configured to retrieve the current output value from registers included in the electronic processor 420 or from the memory 425. In some instances, such as when the vehicle is initially started and/or idling, the current output value is equal to the minimum output value 610. In some instances, the current output value is a different value.

At block 710, the controller 405 determines the value of the pressing force threshold 615. In one example in which the pressing boundary 620 is modeled as a linear function, the controller 405 is configured to determine the pressing force threshold 615 by using Equation 1 described above. In an example in which the pressing boundary 620 is modeled as another type of function (e.g., a quadratic function, a logarithmic function, an exponential function, a table-valued function, a step function, etc.), the controller 405 is configured to determine the pressing force threshold 615 using a different method.

At block 715, the controller 405 receives, from the sensor 120, a signal indicative of an amount of force that is currently being exerted on the pedal 100. At block 715, the controller 405 determines a value of the force that is being exerted on the pedal 100 based on the signal received from sensor 120.

At block 720, the controller 405 determines whether the value of the force that is currently being exerted on the pedal 100 exceeds the pressing force threshold 615. When the controller 405 determines that the force being exerted on the pedal 100 exceeds the pressing force threshold 615, the controller 405 determines a proposed output value, such as a first proposed output value, for controlling the vehicle (block 725). In one example in which the pressing boundary 620 is modeled as a linear function, the controller 405 determines the proposed output value by using Equation 2 described above. In an example in which the pressing boundary 620 is modeled as another type of function (e.g., a quadratic function, a logarithmic function, an exponential function, a table-valued function, a step function, etc.), the controller 405 determines the proposed output value using a different method.

At block 730, the controller 405 determines whether the proposed output value determined at block 725 exceeds the maximum output value 625. When the controller 405 determines that the proposed output value exceeds the maximum output value 625, the controller 405 sets the proposed output value as a second proposed output value to be equal to the maximum output value 625 (block 735).

At block 740, the controller 405 generates an output signal for controlling the output power of the vehicle. In one example, the controller 405 generates an output signal that has a value that is equal to the current proposed output value. For example, if at block 730 the controller 405 determines that the proposed output value exceeds the maximum output value 625, the controller 405 generates an output signal having a value that is equal to the maximum output value 625 at block 740. Alternatively, if at block 730 the controller 405 determines that the proposed output value does not exceed the maximum output value 625, the controller 405 generates an output signal having a value that is equal to the proposed output value that was determined at block 725. The controller 405 is also configured to provide the generated output signal to the vehicle control unit 410 and return to block 710 of the method 700. In some instances, the controller 405 stores the value of the output signal generated at block 720 as the current output value in the register(s) included in electronic processor 420 and/or the memory 425.

With reference to block 720, when the controller 405 determines that the force being exerted on the pedal 100 does not exceed the pressing force threshold 615, the controller 405 determines the value of the releasing force threshold 635 (block 745). In one example in which the releasing boundary 640 is modeled as a linear function, the controller 405 determines the releasing force threshold 635 by using Equation 3 described above. In an example in which the releasing boundary 640 is modeled as another type of function (e.g., a quadratic function, a logarithmic function, an exponential function, a table-valued function, a step function, etc.), the controller 405 is configured to determine the releasing force threshold 635 using a different method.

At block 750, the controller 405 determines whether the value of the force that is currently being exerted on the pedal 100 is less than the releasing force threshold 635. When the controller 405 determines that the force currently exerted on the pedal 100 is not less than the releasing force threshold 635, the controller 405 generates an output signal that has a value that is equal to the current output value (block 740). In the example illustrated, the controller 405 provides the generated output signal to the vehicle control unit 410 and returns to block 710 of the method 700. In some instances, the controller 405 stores the value of the output signal generated at block 720 as the current output value in the register(s) included in electronic processor 420 and/or the memory 425.

When the controller 405 determines that the force being exerted on the pedal 100 is less than the releasing force threshold 635, the controller 405 determines a proposed output value for controlling the vehicle (block 755). In one example in which the releasing boundary 640 is modeled as a linear function, the controller 405 determines the proposed output value by using Equation 4 described above. In an example in which the releasing boundary 640 is modeled as another type of function (e.g., a quadratic function, a logarithmic function, an exponential function, a table-valued function, a step function, etc.), the controller 405 determines the proposed output value using a different method.

At block 760, the controller 405 is configured to determine whether the proposed output value determined at block 755 is less than the minimum output value 610. When the controller 405 determines that the proposed output value determined at block 755 is not less than the minimum output value 610, the controller 405 is configured to proceed to block 740 and generate an output signal that has a value that is equal to the proposed output value determined at block 755. Furthermore, the controller 405 is configured to provide the generated output signal to the vehicle control unit 410 and return to block 710 of the method 700. In some instances, the controller 405 stores the value of the output signal generated at block 740 as the current output value in the register(s) included in electronic processor 420 and/or the memory 425.

When the controller 405 determines that the proposed output value determined at block 755 is less than minimum output value 610, the controller 405 sets the proposed output value to be equal to the minimum output value 610 (block 765). In the example shown, the controller 405 proceeds to block 740 and generates an output signal that has a value that is equal to the minimum output value 610. The controller 405 also provides the generated output signal to the vehicle control unit 410 and return to block 710 of the method 700. In some instances, the controller 405 stores the value of the output signal generated at block 740 as the current output value in the register(s) included in electronic processor 420 and/or the memory 425.

As described above, in one example, the controller 405 returns to block 710 of the method 700 after generating and providing the output signal to the vehicle control unit at block 740 of the method 700. Accordingly, the controller 405 repeats the method 700 beginning at block 710. In some instances, the controller 405 is configured to repeatedly perform the method 700 at a rate of 100 Hertz (Hz). In some instances, the controller 405 is configured to repeatedly perform the method 700 at a rate of 1 kHz. In some instances, the controller 405 is configured to repeatedly perform the method 700 at a rate of 10 kHz. In some instances, the controller 405 is configured to repeatedly perform the method 700 at a rate of 1 MHz. In some instances, the controller 405 is configured to repeatedly perform the method 700 at a different rate.

FIGS. 8-15 illustrate another example low displacement vehicle pedal assembly, or pedal, 800 that is adapted for use with the systems (e.g., controller 405, vehicle control unit 410, etc.) and methods (e.g., method 700) for emulating a mechanical hysteresis effect in a low displacement vehicle pedal described herein. It should be understood that description of the interaction between pedal 100 and the controller 405/vehicle control unit 410 described above may also be applicable to the pedal 800. Moreover, it should be understood that one or more components of the pedal 800 may be used to perform the method 700 of emulating a mechanical hysteresis effect in a low displacement vehicle pedal assembly described above.

Similar to the pedal 100, the pedal 800 includes one or more connectors (not shown) that electrically connect the pedal 800 to a bus system of a vehicle and/or the control unit of a vehicle that implements the systems and methods for emulating a mechanical hysteresis effect in a low displacement vehicle pedal described herein. In some instances, the vehicle is a passenger vehicle, such as a car or a light truck. In some instances, the vehicle is a commercial vehicle, such as a van, a bus, a box truck, or a semi-truck. In some instances, the vehicle is a small vehicle such as a motorcycle, a scooter, or an all-terrain vehicle. In some instances, the vehicle is a low-speed vehicle such as a golf cart or a utility cart. In some instances, the vehicle is powered by an internal combustion engine. In some instances, the vehicle is an electric vehicle. In some instances, the pedal 800 is included in and connected to other types of vehicles.

Figure 8:
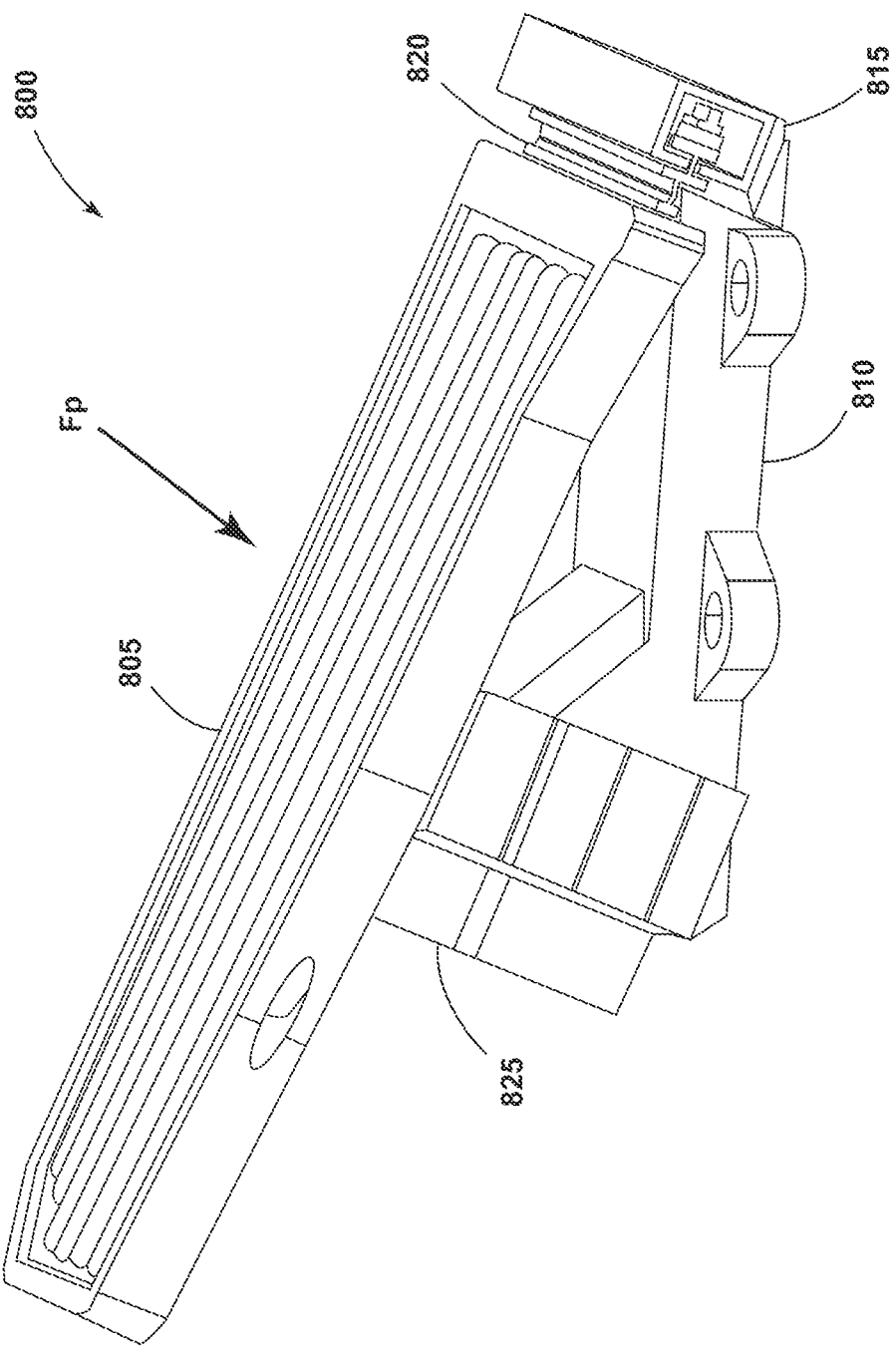
FIGS. 8 and 9 are perspective views of a low displacement vehicle pedal, according to one example.
Figure 9:
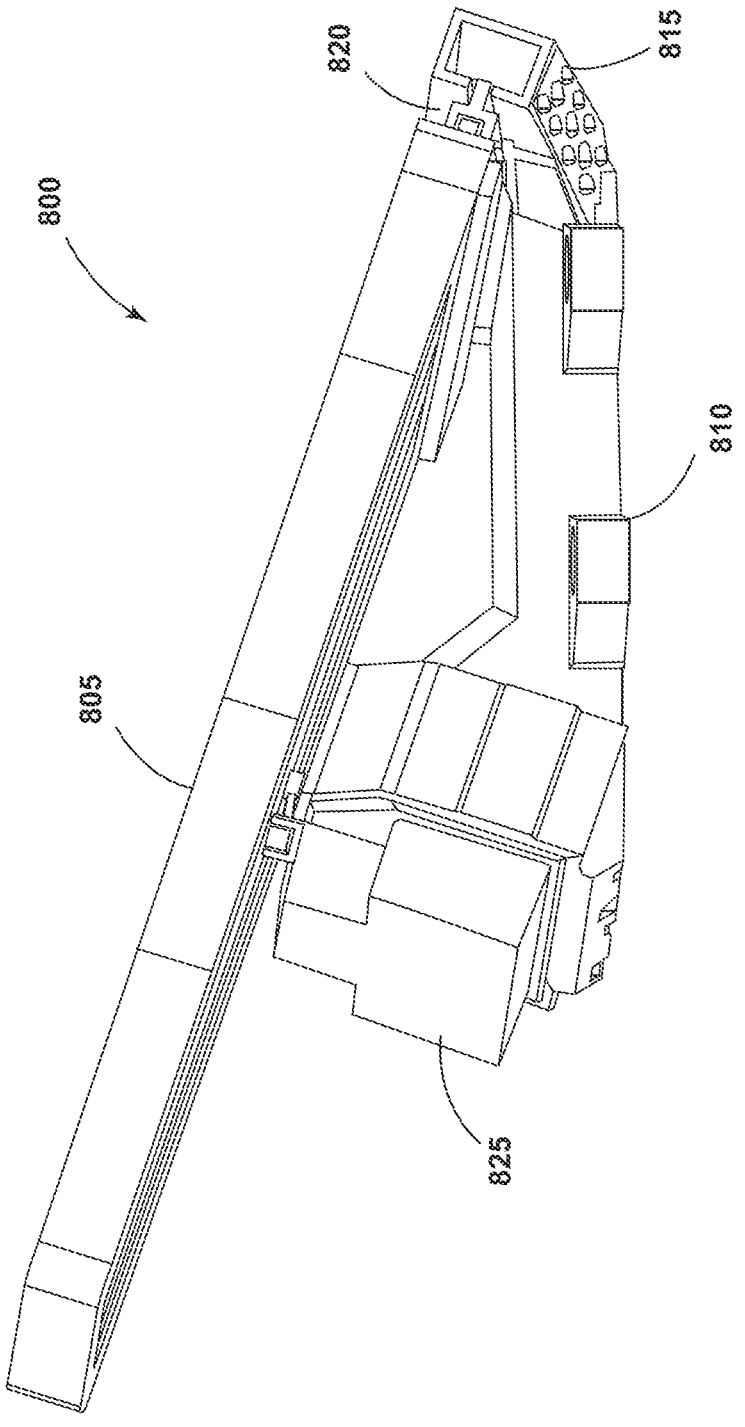
Figure 10:
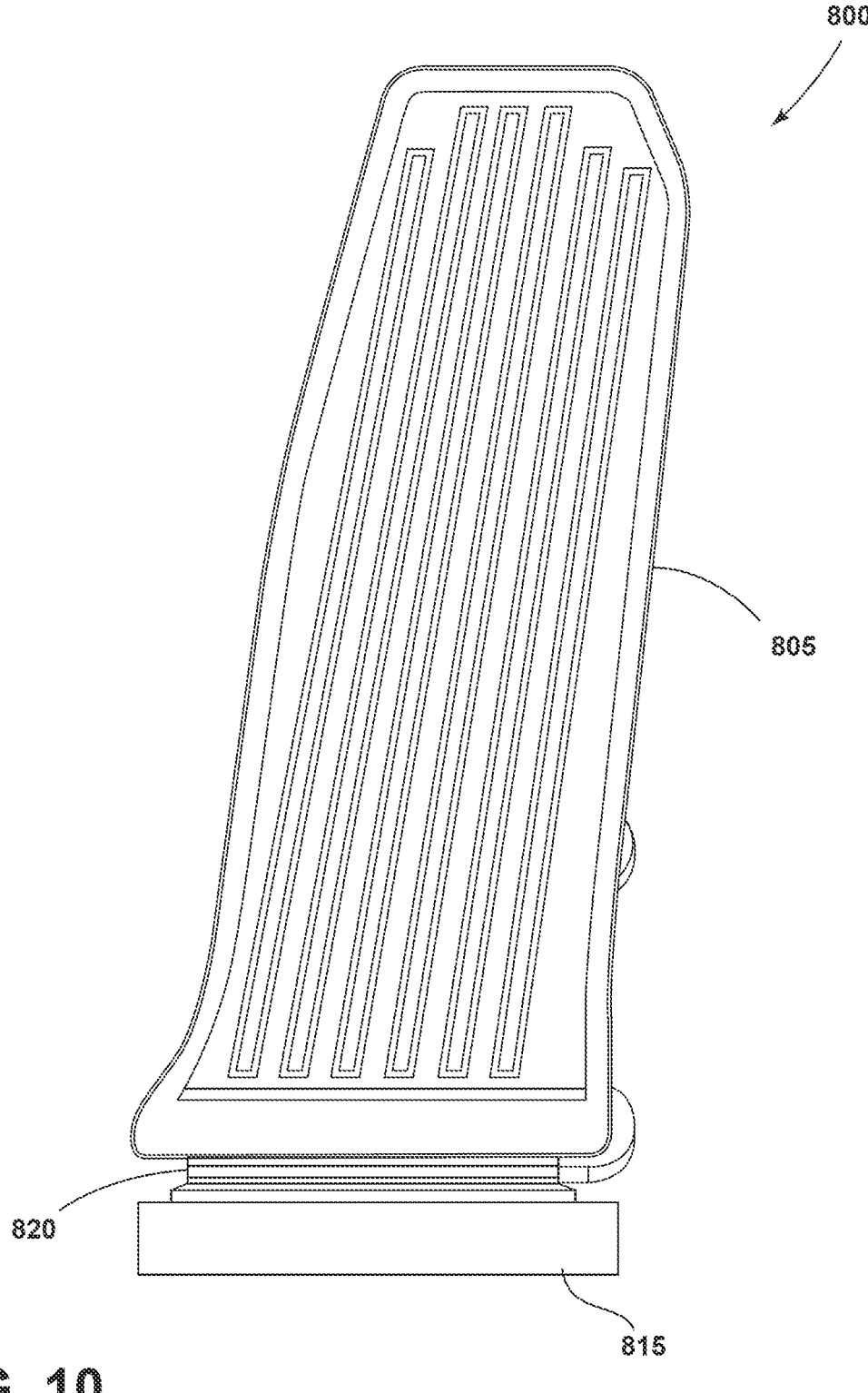
FIG. 10 is a top-down view of the low displacement vehicle pedal of FIGS. 8 and 9, according to one example.

As shown in FIGS. 8-10, the pedal 800 includes a foot pad 805 that is coupled to a pedal base 810 used for mounting the pedal 800 to the vehicle floor (not shown). In particular, the foot pad 805 is coupled to the first end, or toe, 815 of the pedal base 810 by a flexible hinge 820. FIGS. 8-9 show a second end, or heel, 825 of the pedal base 810 that is at an opposing end compared to the toe 815. When compared to a traditional pivot or hinge, the flexible hinge 820 does not rotate about a stationary structure, such as a pin, when a pedal force $F_p$ is exerted on the foot pad 805 by a driver. Rather, the flexible hinge 820 is designed to experience elastic deformation when a pedal force $F_p$ is exerted on and released from the foot pad 805. That is, the flexible hinge 820 bends when a pedal force $F_p$ is applied to the foot pad 805, thereby displacing the foot pad 805 towards the pedal base 810. When the force exerted on the foot pad 805 is released, the flexible hinge 820 unbends and returns the foot pad 805 to an idle position (e.g., no braking/accelerating).

In some instances, the flexible hinge 820 is formed of a sturdy elastic material such as nitrile, which is a synthetic rubber copolymer formed of acrylonitrile and butadiene. In some instances, the flexible hinge 820 is formed of one or more other elastic polymer and/or rubber materials. In some instances, material(s) used to construct the flexible hinge 820 are selected based on the distance the foot pad 805 will be displaced relative to the pedal base 810 when a force is exerted on the foot pad 805. For example, in some instances, the foot pad 805 is designed to travel relative to the pedal base 810 when a driver exerts a force on the foot pad 805. Thus, in such instances, material(s) that are capable of elastically deforming and/or bending to support travel are selected to construct the flexible hinge 820. As another example, in some instances, the foot pad 805 is designed to travel between 0.001-2 mm relative to the pedal base 810 when a driver exerts a force on the foot pad 805. Thus, in such instances, material(s) that are capable of elastically deforming and/or bending to support 0.001-2 mm of travel are selected to construct the flexible hinge 820. In some instances, the flexible hinge 820 is designed so that the foot pad 805 travels a different distance relative to the pedal base 810 when a driver exerts a force on the foot pad 805. For example, in other instances, the flexible hinge 820 is designed so that the foot pad 805 travels less than 0.001-2 mm relative to the pedal base 810, between 0.001-5 mm relative to the pedal base 810, in another instance, more than 5 mm relative to the pedal base 810, or some other distance range such as 0.001 mm to 10 mm relative to the pedal base 810 when a driver exerts a force on the foot pad 805.

As shown in FIGS. 11-15, the pedal 800 also includes a sensor assembly 1100 that is at least partially contained within the second end, or heel, 825 of the pedal base 810. The sensor assembly 1100 includes numerous components that are used to measure an amount of force exerted on the foot pad 805 by a driver's foot. In the illustrated example, the sensor assembly 1100 includes, among other things, a yoke 1105, a spring 1110, first and second sensors 1115A, 1115B, a spacer 1120, and first and second actuators 1125A, 1125B.

The spring 1110 is positioned and compressed between the yoke 1105 and the first actuator 1125A. The yoke 1105 includes, or is otherwise connected, to an end cap 1130 that is positioned to support and engage a bottom surface of the foot pad 805. The yoke 1105 also includes a central locating element, such as a rod, 1135 that is positioned to prevent movement of the spring 1110 in the x and y directions. In the illustrated example, a first end of the spring 1110 coaxially surrounds the rod 1135 such that the first end of the spring

1110 is restricted from moving in the x and y directions when the first end of the spring 1110 is compressed against the yoke 1105. The second end of the spring 1110 coaxially surrounds the first actuator 1125A such that the second end of the spring 1110 is restricted from moving in the x and y directions when the second end of the spring 1110 is pressed against the first actuator 1125A.

Figure 11:
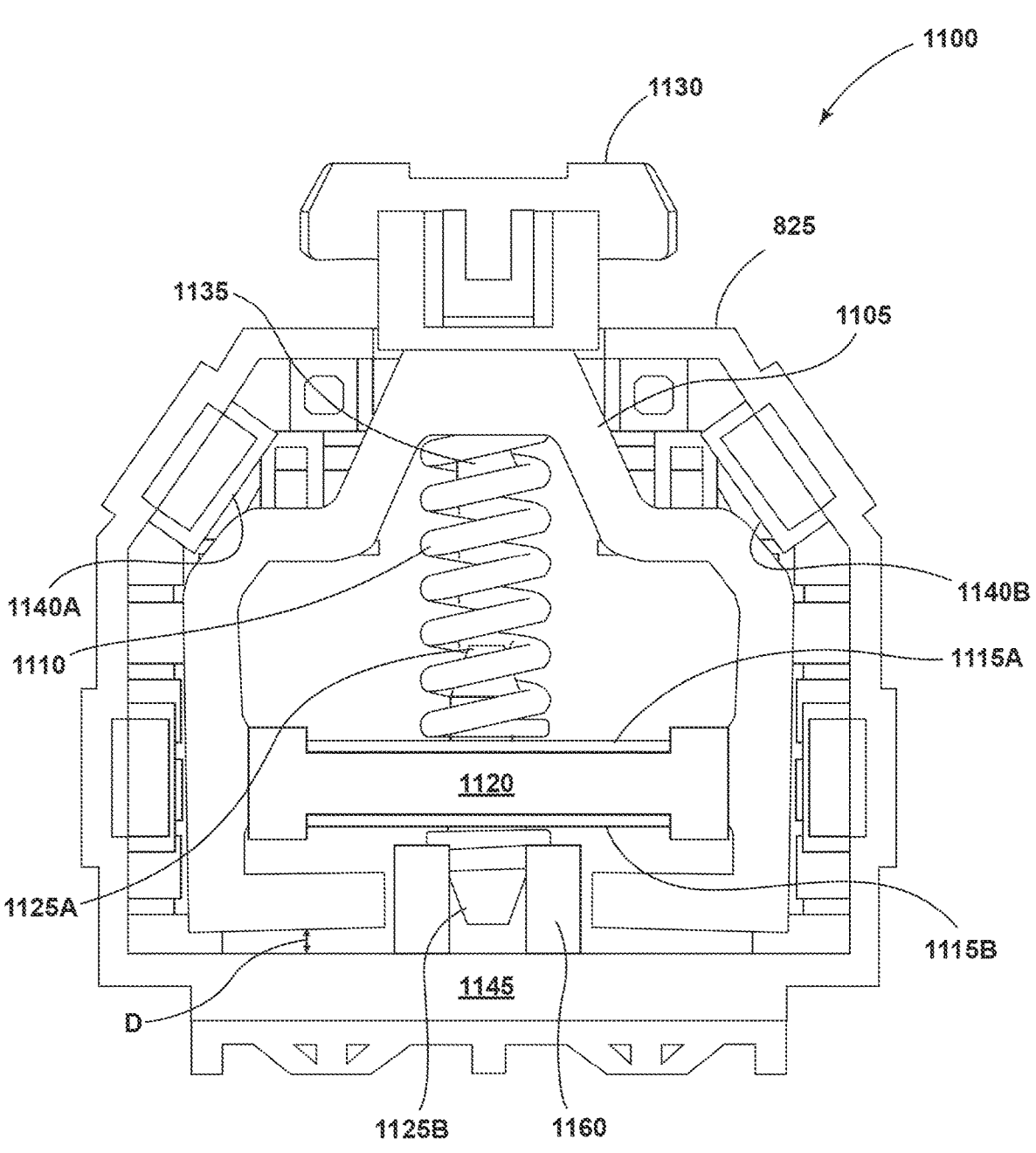
FIG. 11 is a vertical cross-section of a sensor assembly included in the low displacement vehicle pedal of FIGS. 8-10 in its idle position, according to one example.

FIG. 11 illustrates the sensor assembly 1100 when the pedal 800 is in the idle position (e.g., no braking/accelerating is requested by a driver). When the pedal 800 is in the idle position, the spring 1110 exerts an upward force on the yoke 1105 thereby by pushing the end cap 1130 against the bottom surface of the foot pad 805. Moreover, when the pedal 800 is in the idle position, the foot pad 805 is supported in the idle position at least in part by the end cap 1130. The interior of the heel 825 includes first and second protruding members 1140A, 1140B that restrict upward movement of the yoke 1105 along the z-axis when the pedal 800 is in the idle position. As shown, the spring 1110 pushes the yoke 1105 against the first and second protruding members 1140A, 1140B when the pedal 800 is in the idle position. When the pedal 800 is in the idle position, the bottom of the yoke 1105 is spaced apart from a bottom surface 1145 of the heel 825 by a distance D.

Figure 12:
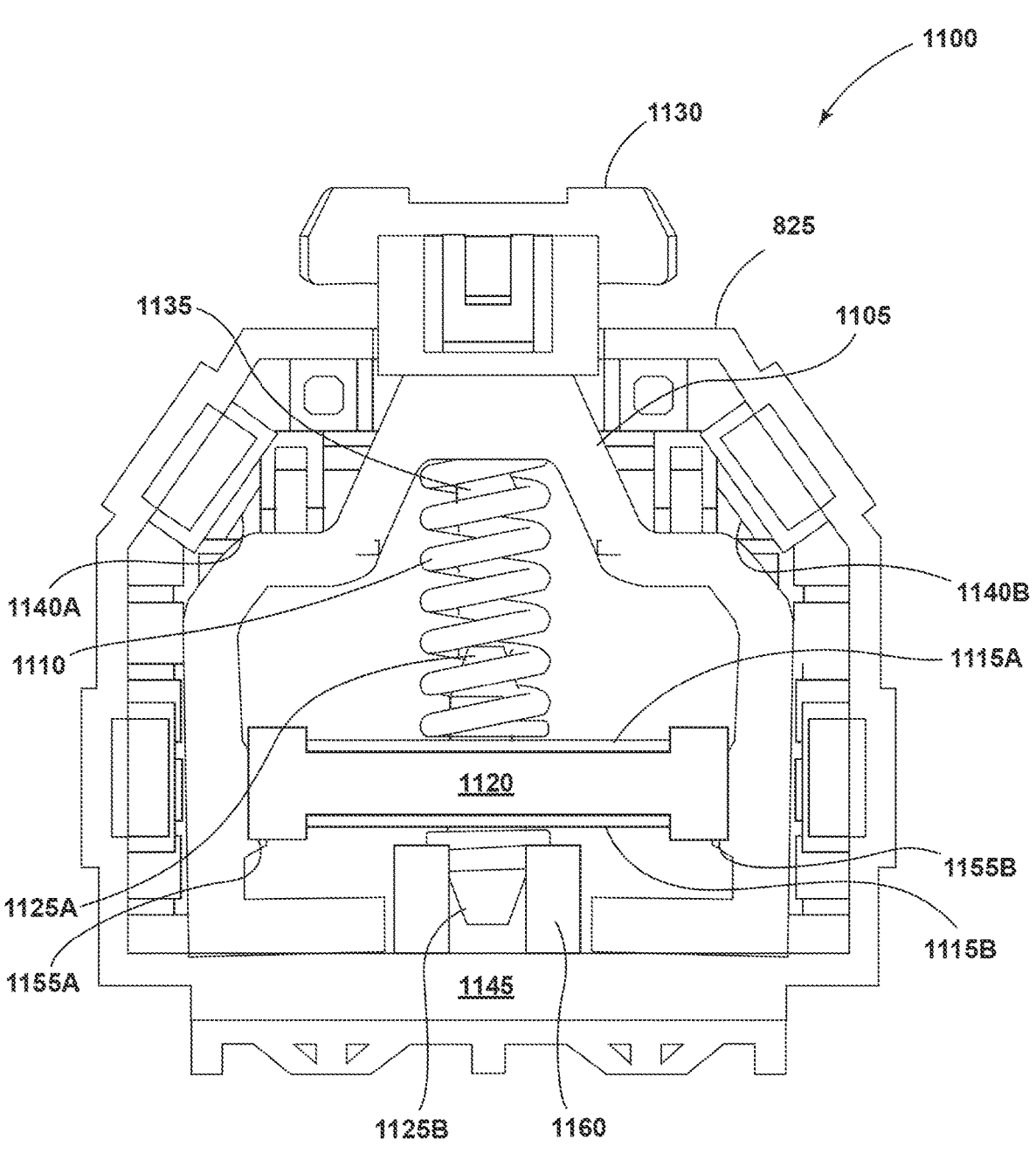
FIG. 12 is a vertical cross-section of a sensor assembly included in the low displacement vehicle pedal of FIGS. 8-10 in its engaged position, according to one example.
Figure 13:
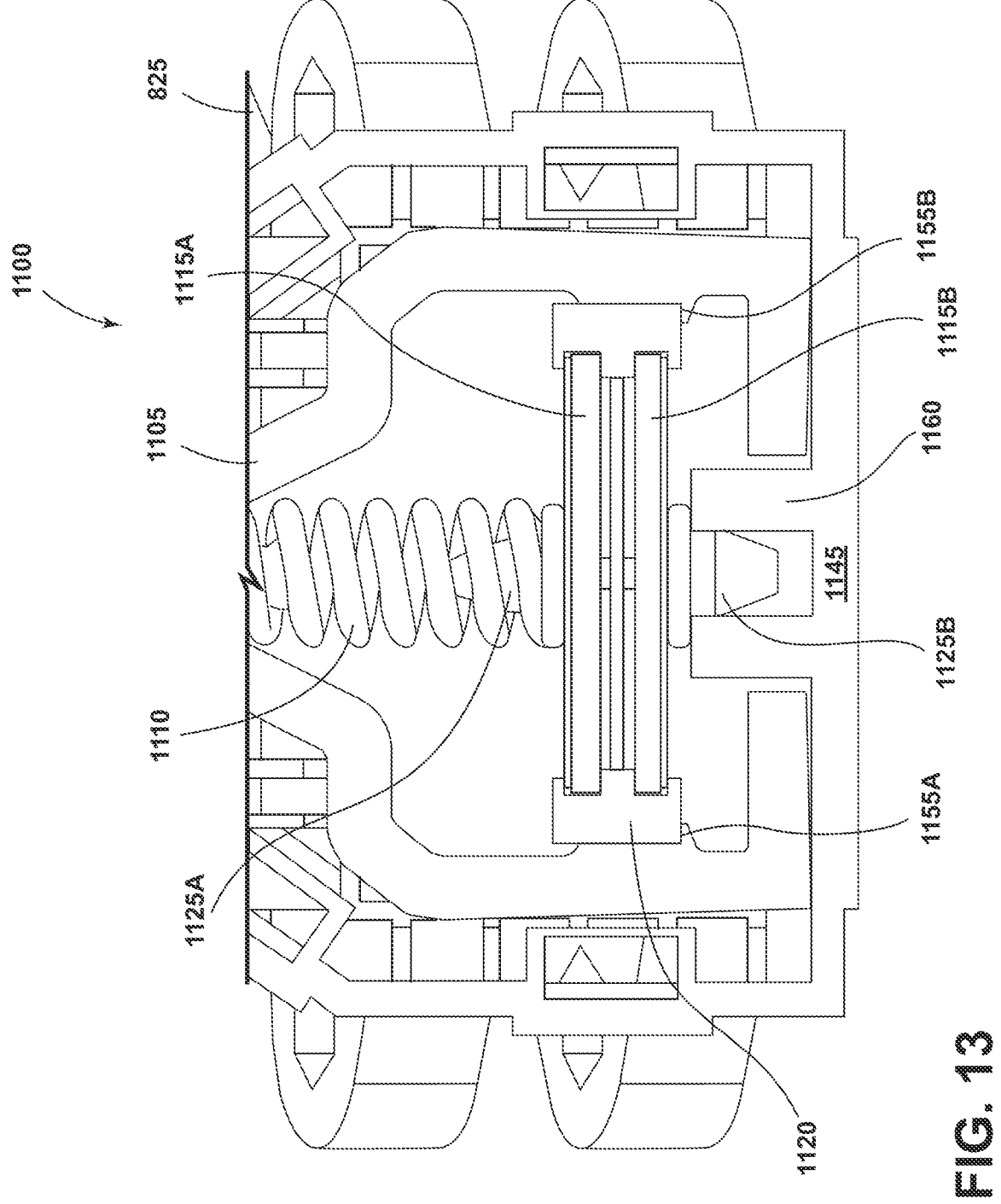
FIG. 13 is another vertical cross-section of a sensor assembly included in the low displacement vehicle pedal of FIGS. 8-10 in its engaged position, according to one example.

FIGS. 12 and 13 illustrate the sensor assembly 1100 when the pedal 800 is in the fully compressed, or engaged, position (e.g., braking/accelerating is requested by a driver). When the pedal 800 is in the engaged position, the foot pad 805 exerts the pedal force $F_p$ onto end cap 1130 thereby causing downward movement of the yoke 1105 along the z-axis. That is, when a driver presses the foot pad 805 in the direction of the pedal base 810 from the idle position to the engaged position, the yoke 1105 travels the distance D along the z-axis until the yoke 1105 is pressed against bottom surface 1145 of the heel 825. The spring 1110 is compressed in the z direction. The bottom surface 1145 prevents further movement of the yoke 1105 along the z-axis. Thus, if a driver maintains or increases the force exerted on the foot pad 805 while the yoke 1105 is pressed against the bottom surface 1145, damage, such as warping, to the sensors 1115A, 1115B is reduced or prevented.

In operation, the sensors 1115A, 1115B sense an amount of pedal force $F_p$ that a driver exerts on the foot pad 805. The sensors 1115A, 1115B are connected in series along the load path from the foot pad 805 through the sensor assembly 1100 such that each of the sensors 1115A, 1115B produces the same force measurement. That is, assuming the sensors 1115A and 1115B are properly calibrated and/or not damaged, the electricals signals generated by the first sensor 1115A and the second sensor 1115B indicate approximately the same force value. When compared to the pedal 100 described above, the redundant sensors 1115A, 1115B provide the pedal 800 with improved error-proofing and fail-safe capabilities associated with sensing the amount of force a driver exerts on the foot pad 805. In some instances, the sensor assembly 1100 includes more than two sensors. In other instances, the sensor assembly 1100 includes only a single sensor.

As shown, the first sensor 1115A is coupled to a top surface of the spacer 1120 such that the first sensor 1115A is positioned between the top surface of the spacer 1120 and the first actuator 1125A. Similarly, the second sensor 1115B is coupled to a bottom surface of the spacer 1120 such that the second sensor 1115B is positioned between the bottom surface of the spacer 1120 and the second actuator 1125B. As best shown in the top-down view of FIG. 15, the spacer 1120 includes first and second notches 1150A, 1150B that respectively engage first and second guide ribs 1155A, 1155B that protrude from inner surfaces of the yoke 1105. When the notches 1150A, 1150B of the spacer 1120 are respectively engaged with the guide ribs 1155A, 1155B protruding from the yoke 1105, the spacer 1120 is restricted from moving in the x and y directions. However, the yoke 1105 is free to slide upwards and downwards along the z-axis relative to the spacer 1120 when the notches 1150A, 1150B are respectively engaged with the guide ribs 1155A, 1155B, as the guide ribs 1155A, 1155B do not restrict movement of the yoke 1105 and/or spacer 1120 along the z-axis.

In the illustrated example, the sensors 1115A, 1115B are implemented as strain gauge sensors that operate in a similar manner to the strain gauge 125 included in pedal 100. For example, the strain gauge sensor 1115A includes electrically resistive strip elements or resistors that are arranged in a bridge circuit. In one arrangement, the bridge circuit is a Wheatstone bridge circuit. The first actuator 1125A is arranged to abut against the surface of the first strain gauge sensor 1115A such that when a driver presses the foot pad 805 in the direction of the pedal base 810 from the idle position to the engaged position, the yoke 1105 compresses the spring 1110 thereby causing the first actuator 1125A to exert a force against the first strain gauge sensor 1115A. The force exerted on the first strain gauge sensor 1115A results in a deflection or bending of the first strain gauge sensor 1115A, which in turn results in a change in the characteristics of the electrically resistive elements (not shown) formed or mounted on the first strain gauge sensor 1115A. This change in resistance causes the first strain gauge sensor 1115A to generate an electrical signal that is indicative of an amount of force (e.g., the pedal force $F_p$) exerted by the driver onto the foot pad 805, and more generally, the amount of force exerted on the pedal 800.

Similar to the first strain gauge sensor 1115A and the first actuator 1125A, the second actuator 1125B is arranged to abut against the surface of the second strain gauge sensor 1115B such that when a driver presses the foot pad 805 in the direction of the pedal base 810 from the idle position to the engaged position, the yoke 1105 compresses the spring 1110, the force is transmitted to first upper actuator 1125A, and then to upper first strain gauge sensor 1115A. The force then passes from the lower surface of the first strain gauge sensor 1115A to spacer 1120, and then passes through the spacer 1120 to an upper surface of the second strain gauge sensor 1115B. This force then goes to second lower actuator 1125B and finally to structure 1160. The force exerted on the second strain gauge sensor 1115B results in a deflection or bending of the second strain gauge sensor 1115B, which in turn results in a change in the characteristics of the electrically resistive elements (not shown) formed or mounted on the second strain gauge sensor 1115B. This change in resistance causes the second strain gauge sensor 1115B to generate an electrical signal that is indicative of an amount of force (e.g., the pedal force $F_p$) exerted by the driver on the foot pad 805, and more generally, the amount of force exerted on the pedal 800.

Figure 14:
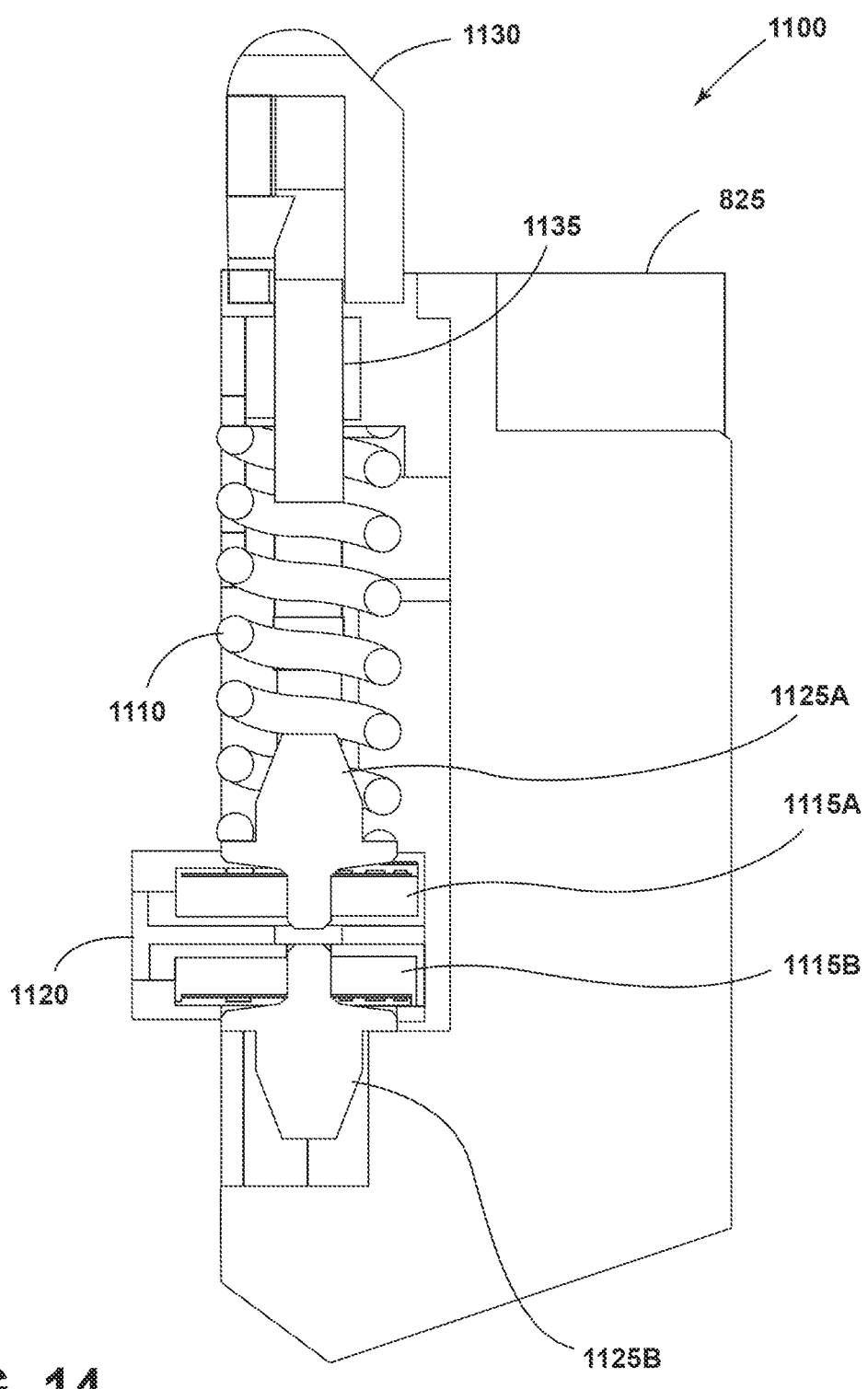
FIG. 14 is another vertical cross-section of a sensor assembly included in the low displacement vehicle pedal of FIGS. 8-10 in its engaged position, according to one example.
Figure 15:
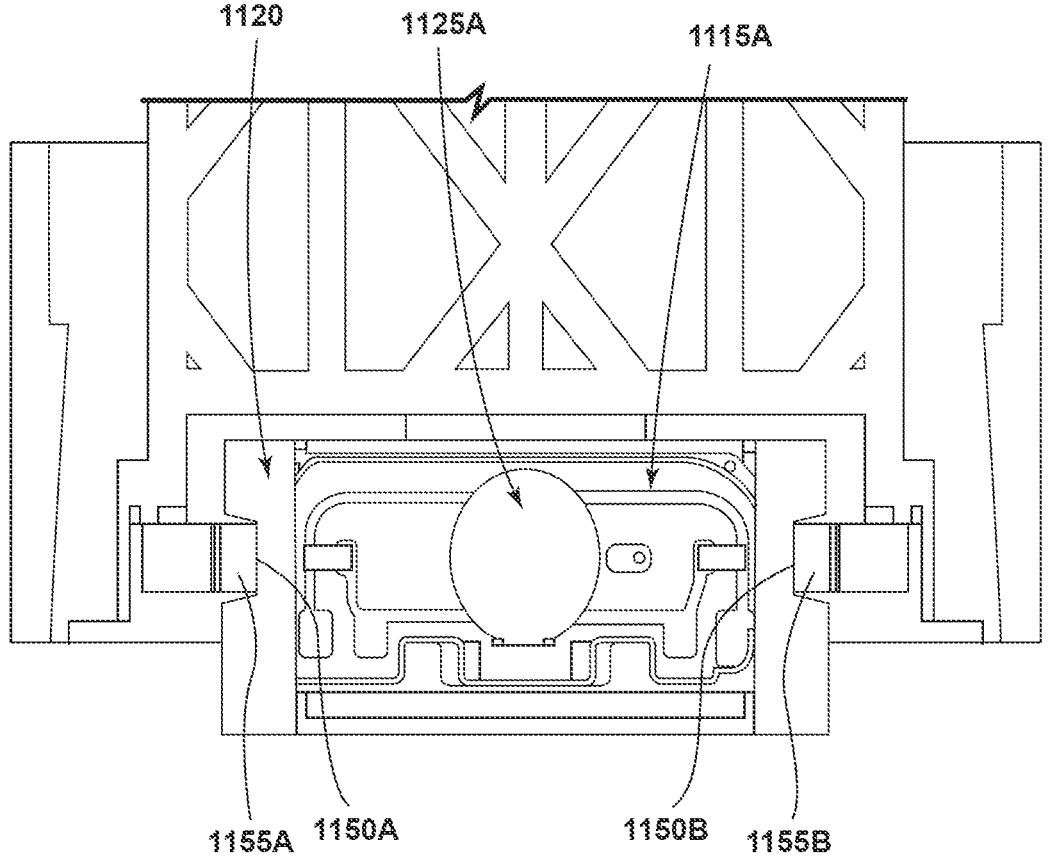
FIG. 15 is a top-down view of a sensor assembly included in the low displacement vehicle pedal of FIGS. 8-10, according to one example.

In the illustrated example, the second actuator 1125B is supported by an upright structure 1160 that extends upwards from the bottom surface 1145 of the heel 825. Thus, when the pedal 800 is in the engaged position, the load exerted on the yoke 1105 by the foot pad 805 is transferred to the second actuator 1125B through the bottom surface 1145 and the upright structure 1160. As shown in FIGS. 13-15, the first and second strain gauge sensors 1115A, 1115B include respective central through holes formed therein. The central through hole formed in the first strain gauge sensor 1115A receives a downward extending portion of the first actuator 1125A. Similarly, the through hole formed in the second strain gauge sensor 1115B receives an upward extending portion of the second actuator 1125B.

It should be understood that the first and second sensors 1115A, 1115B are not limited in implementation to the strain gauge sensors that are illustrated in FIGS. 11-15 and described above. In some instances, the sensors 1115A, 1115B are implemented using a different type of sensor. For example, in some instances, the sensors 1115A, 1115B are implemented as a non-contacting sensors, such as a Hall Effect sensors. As another example, in some instances, the sensors 1115A, 1115B are implemented as a contacting resistive potentiometric sensors. In some instances, the sensors 1115A, 1115B are implemented as other sensor types that are not explicitly described herein. However, regardless of which type of sensor is used to implement the first and second sensors 1115A, 1115B, the sensors 1115A, 1115B are configured to generate respective electrical signals that are indicative of an amount of force exerted by the driver onto the foot pad 805.

Figure 16:
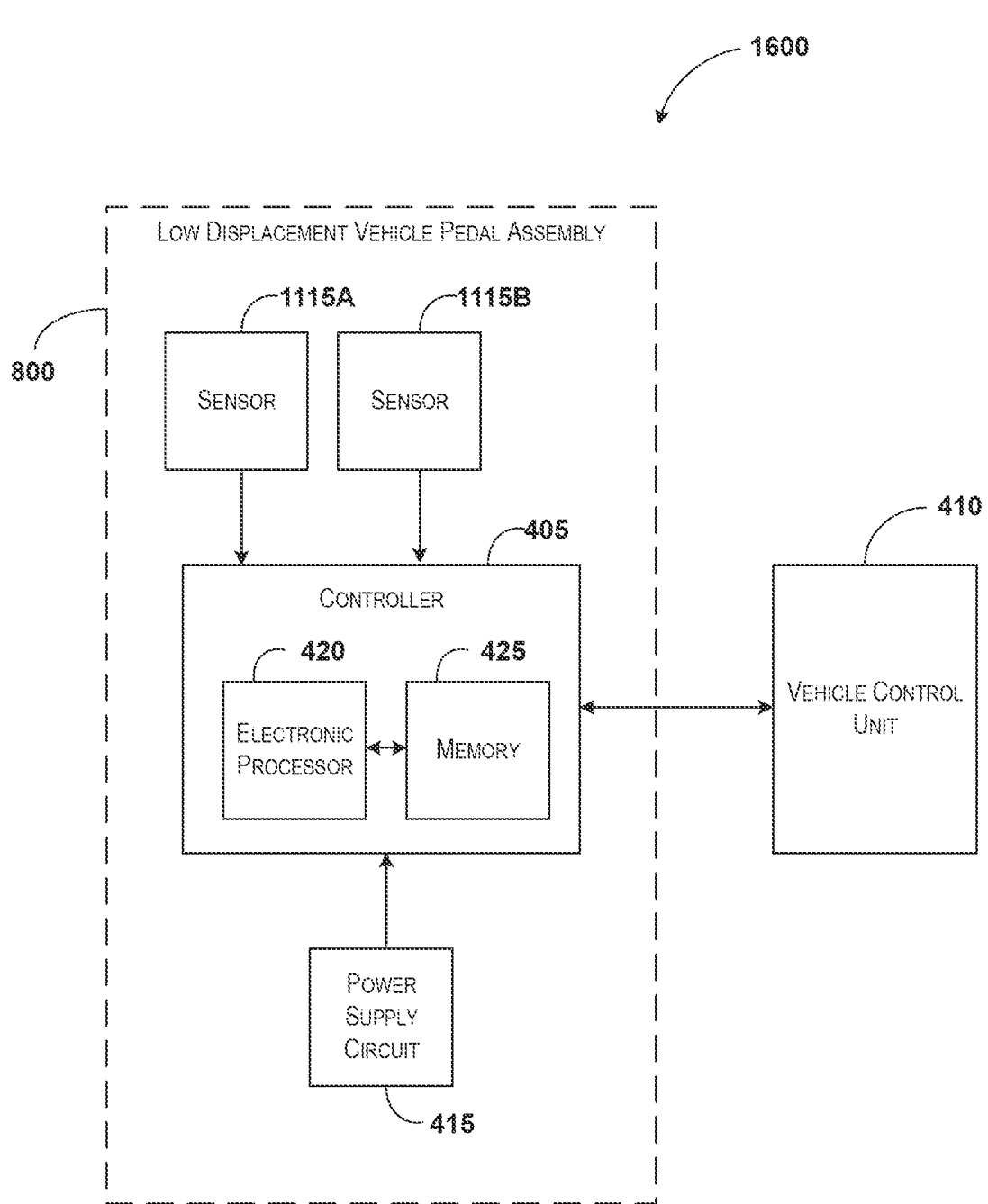
FIG. 16 is a block diagram of a control system for a low displacement vehicle pedal assembly, according to one example.

Similar to the electrical signals generated by the sensor 120 included in pedal 100, the controller 405 and/or the vehicle control unit 410 is configured to generate, based in part on the electrical signals generated by the first and second sensors 1115A, 1115B, an output signal for driving the vehicle in accordance with the mechanical hysteresis emulation systems and methods described herein. For example, the controller 405 and/or the vehicle control unit 410 executes method 700 described above by using the electrical signals generated by the first and/or second sensors 1115A, 1115B. In some instances, the pedal 800 includes its own controller, such as the controller 405, that is electrically connected to the first and second sensors 1115A, 1115B. In such instances, the controller 405 may receive the electrical signals generated by the first and second sensors 1115A, 1115B directly from the first and second sensors 1115A, 1115B. In other instances, the first and second sensors 1115A, 1115B are connected to the controller 405 by a PCB (not shown) included in the pedal 800. FIG. 16 illustrates a block diagram of an example control system 1600 of the pedal 800 for instances in which the pedal 800 includes its own controller.

Figure 17:
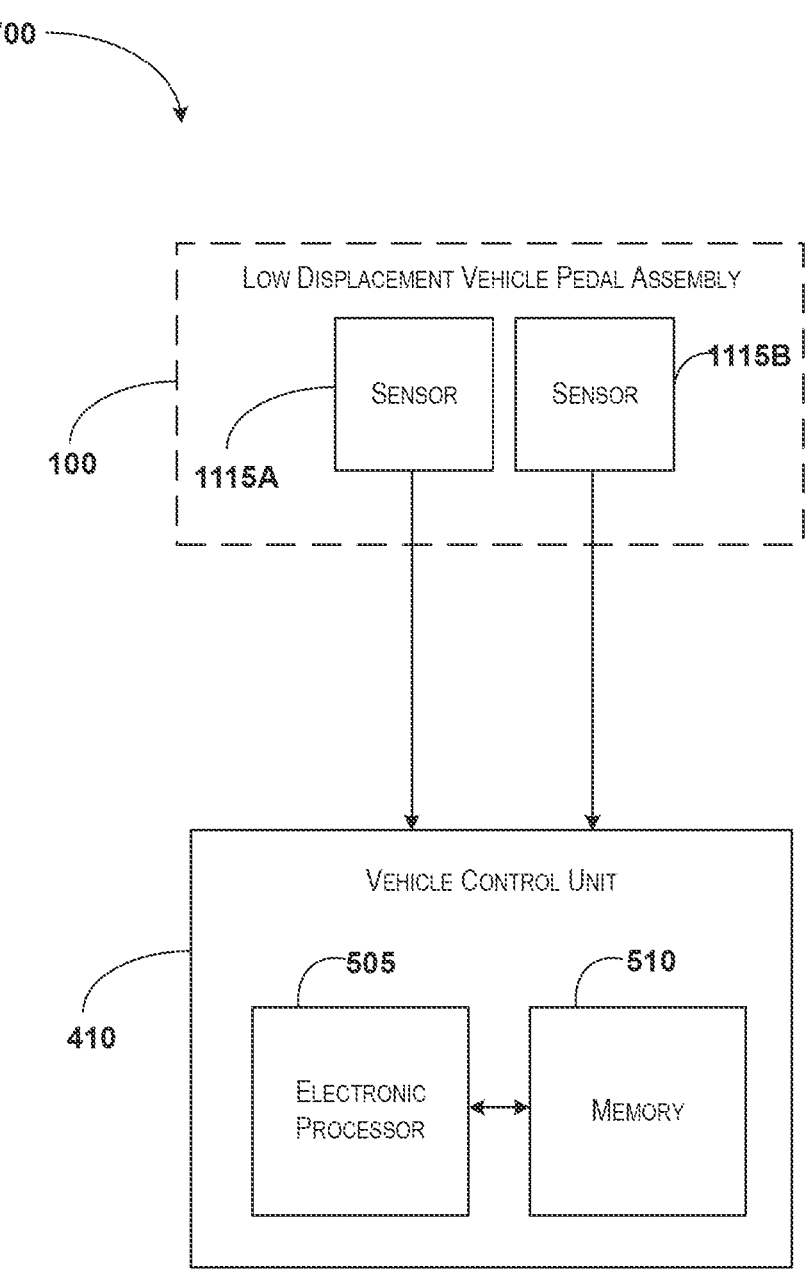
FIG. 17 is a block diagram of a control system for a low displacement vehicle pedal assembly, according to another example.
Figure 18:
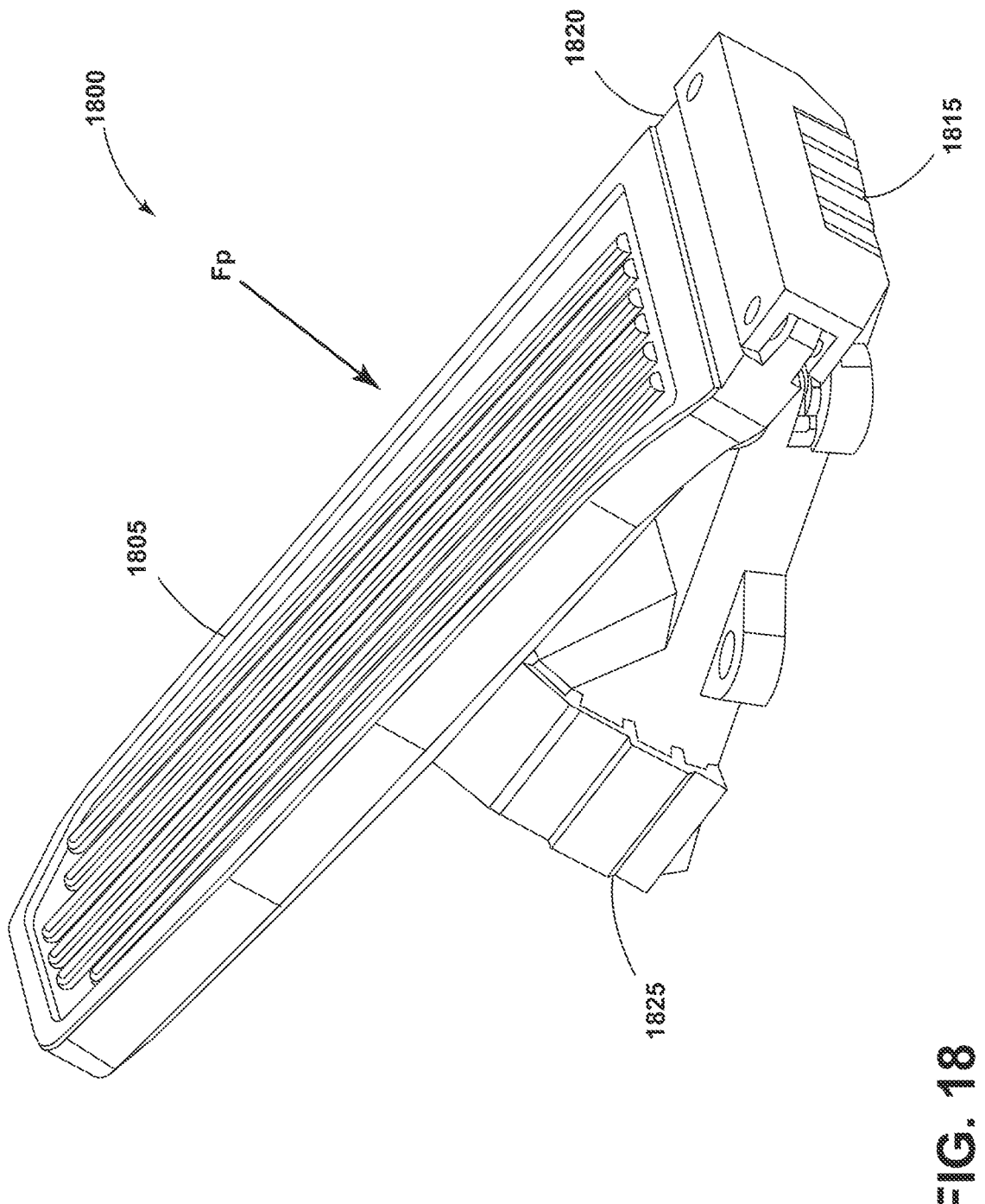
FIG. 18 is perspective view of low displacement vehicle pedal, according to one example.

In other instances, the pedal 800 may not include its own controller. In such instances, the functionality described above with respect to controller 405 is performed by the vehicle control unit 410. FIG. 17 illustrates an example control system 1700 for the pedal 800 in which the vehicle control unit 410 is configured to perform the functions that are described herein as being performed by one or more components of the controller 405. In such instances, the vehicle control unit may receive the electrical signals generated by the first and second sensors 1115A, 1115B directly from the sensors 1115A, 1115B via cables connected between the sensors 1115A, 1115B and the vehicle control unit 410. In other instances, the first and second sensors 1115A, 1115B are connected to the vehicle control unit 410 by a PCB (not shown) included in the pedal 800.

In some instances, the controller 405 and/or the vehicle control unit 410 determines the amount of force exerted on the foot pad 805 based on both the electrical signals generated by the first sensor 1115A and the electrical signals generated by the second sensor 1115B. For example, in some instances, the controller 405 and/or the vehicle control unit 410 determines that the amount force exerted on the foot pad 805 is equal to an average of the force values indicated by the electrical signals generated by the first and second sensors 1115A, 1115B. In other instances, the controller 405 and/or the vehicle control unit 410 determines the amount of force exerted on the foot pad 805 based on electrical signals generated by only one of the sensors 1115A, 1115B. In such instances, the controller 405 and/or the vehicle control unit 410 uses the electrical signals generated by the other one of the sensors 1115A, 1115B to verify whether the sensor used for determining the amount of force exerted on the foot pad 805 is providing accurate measurements. For example, it will be assumed that in some instances, the controller 405 and/or the vehicle control unit 410 determines the amount of force exerted on the foot pad 805 based on the electrical signals received from the first sensor 1115A. In such instances, the controller 405 and/or the vehicle control unit 410 verifies the accuracy of the force value sensed by the first sensor 1115A based on the electrical signals generated by the second sensor 1115B. For example, the controller 405 and/or the vehicle control unit 410 determines whether the force value indicated by the electrical signals received from the first sensor 1115A differs from the force value indicated by the electrical signals received from the second sensor 1115B by more than a threshold (e.g., 5%). If the controller 405 and/or the vehicle control unit 410 determines that the difference exceeds the threshold, the controller 405 and/or the vehicle control unit 410 determines that at least one of the sensors 1115A, 1115B is providing inaccurate force measurements. If the controller 405 and/or the vehicle control unit 410 determines that the difference is less than the threshold, the controller 405 and/or the vehicle control unit 410 generates an output signal for controlling the vehicle based in part on the electrical signals received form the first sensor 1115A.

FIGS. 18-22 illustrate another example low displacement vehicle pedal assembly, or pedal, 1800 that is adapted for use with the systems (e.g., controller 405, vehicle control unit 410, etc.) and methods (e.g., method 700) for emulating a mechanical hysteresis effect in a low displacement vehicle pedal described herein. The pedal 1800 is similar in construction to the pedal 800 described herein. For example, the pedal 1800 includes a foot pad 1805 that is similar in construction to the foot pad 805, a pedal base 1810, which includes a toe 1815 and heel 1825, that is similar in construction to the pedal base 810, and the same sensor assembly 1100 that is included in the pedal 800. Thus, it should be understood that the description above of the interaction between pedals 100, 800 and the controller 405/vehicle control unit 410 is also applicable to the pedal 1800. It should be understood that one or more components of the pedal 1800 may be used to perform the method 700 of emulating a mechanical hysteresis effect in a low displacement vehicle pedal assembly described above.

However, unlike the pedals 100 and 800, the foot pad 1805 does not bend or rotate towards the pedal base 1810 when a pedal force $F_p$ is exerted on the foot pad 805. That is, the foot pad 1805 is not coupled to the pedal base 1810 by a flexible hinge or a traditional pivot or hinge that facilitates rotation. Rather, the foot pad 1805 is coupled to the pedal base 1810 by a prismatic joint 1820. The prismatic joint 1820 supports linear displacement of the foot pad 1805 relative to the pedal base 1810. Thus, when a driver exerts a pedal force $F_p$ on the foot pad 1805, the foot pad 1805 is linearly displaced towards the pedal base 1810 instead of bending and/or rotating towards the pedal base 1810.

Figures 19A, 19B:
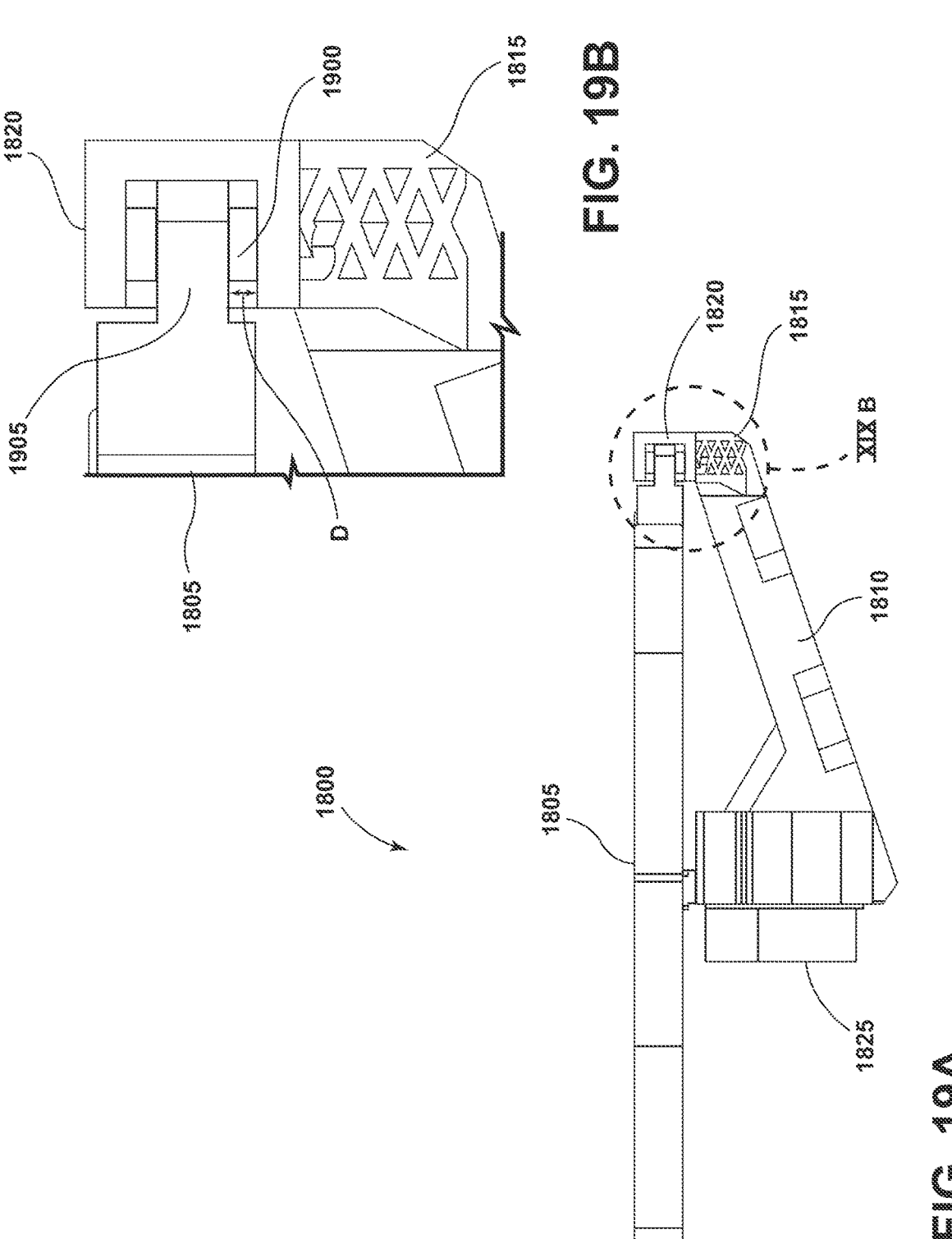
FIG. 19A is a side view of the low displacement vehicle pedal of FIG. 18 in its idle position, according to one example.
FIG. 19B is an enlarged side view of the circled portion of the low displacement vehicle pedal of FIG. 19A.
Figures 20A, 20B:
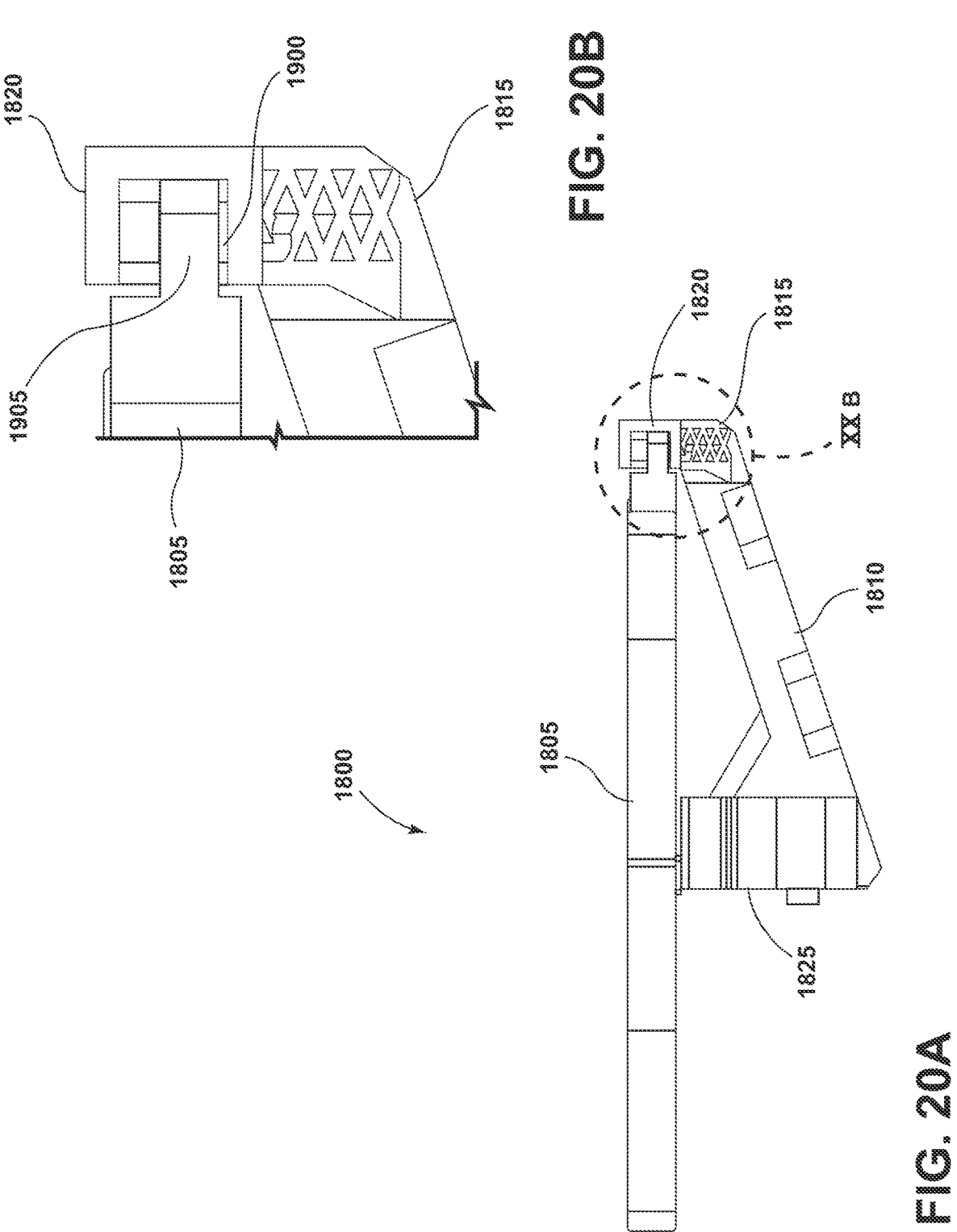
FIG. 20A is a side view of the low displacement vehicle pedal of FIG. 18 in its engaged position, according to one example.
FIG. 20B is an enlarged side view of the circled portion of the low displacement vehicle pedal of FIG. 20A.

FIG. 19A illustrates a side view of the prismatic joint 1820 when the pedal 1800 is in the idle position. As shown in the enlarged side view of FIG. 19B, the prismatic joint 1820 includes a linear bearing 1900 that engages a protruding member 1905 extending from the foot pad 1805. When a driver presses the foot pad 1805 in the direction of the pedal base 810 from the idle position to the engaged position (FIG. 20A), the protruding member 1905, and thus the foot pad 1805, is linearly displaced a distance D along the linear bearing 1900. For example, the protruding member 1905 slides down the linear bearing 1900 from the idle position to the engaged position (FIG. 20B). Although only a single linear bearing 1900 is shown in FIGS. 19A-21B, it should be understood that in some instances, the prismatic joint 1820 includes more than one linear bearing. Similarly, although only a single protruding member 1905 is illustrated in FIGS. 19A-21B, it should be understood that in some instances, the foot pad 1805 includes more than one protruding member that engage the prismatic joint 1820.

Figures 21A, 21B:
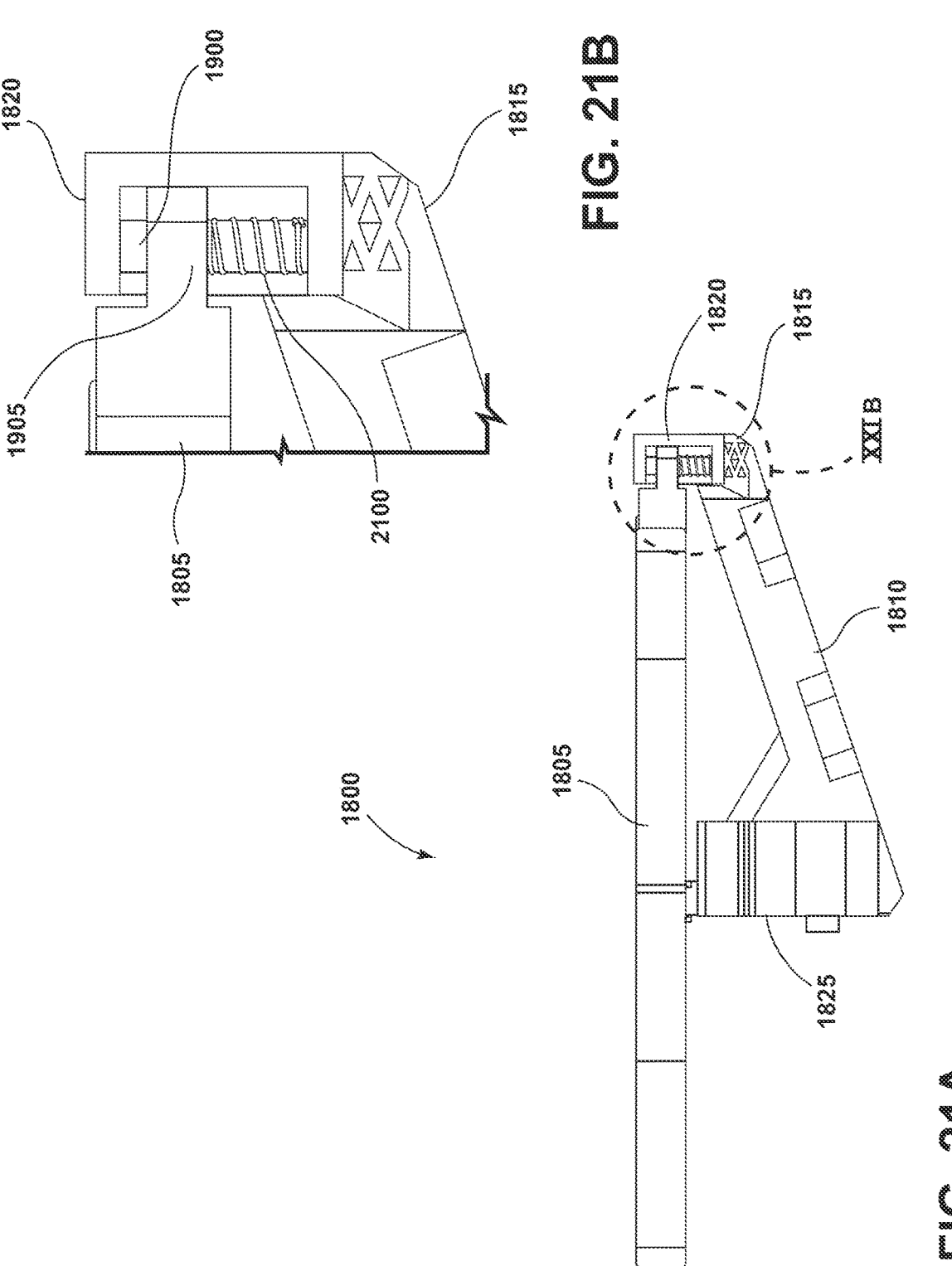
FIG. 21A is another side view of the low displacement vehicle pedal of FIG. 18 in its idle position, according to one example.
FIG. 21B is an enlarged side view of the circled portion of the low displacement vehicle pedal of FIG. 21A.
Figure 22:
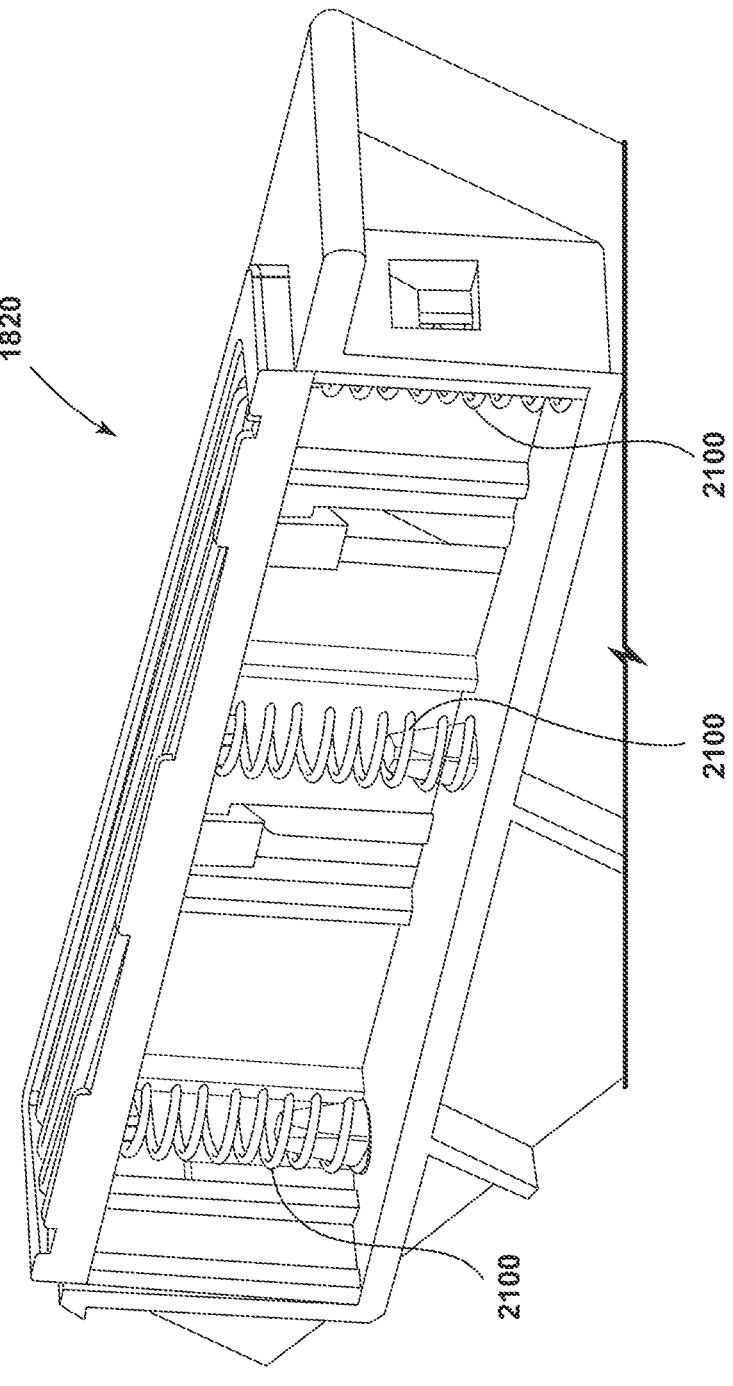
FIG. 22 is a perspective view of a prismatic joint included in the low displacement vehicle pedal of FIG. 18, according to one example Skilled artisans will appreciate that elements in the figures are illustrated for simplicity and clarity and have not necessarily been drawn to scale. For example, the dimensions of some of the elements in the figures may be exaggerated relative to other elements to help to improve understanding of examples.

In some instances, the prismatic joint 1820 also includes springs that assist with returning the foot pad 1805 from the engaged position to the idle position when the driver's foot is released from the foot pad 1805 as shown in FIG. 21A. FIG. 21B illustrates an example in which the prismatic joint 1820 includes a bearing spring 2100 that coaxially surrounds the linear bearing 1900 and assists with pushing the foot pad 1805 from the engaged position to the idle position when the driver's foot is released from the foot pad 1805. Although only a single bearing spring 2100 is shown in FIG. 21, it should be understood that in some instances, the prismatic joint 1820 includes more than one bearing spring. FIG. 22 illustrates a perspective view of the prismatic joint 1820 when the prismatic joint 1820 is not coupled to or otherwise engaging the foot pad 1805. In the illustrated example of FIG. 22, the prismatic joint 1820 includes three bearing springs 2100.

In some instances, the prismatic joint 1820 is designed such that foot pad 1805 linearly travels between 0.001-2 millimeters (mm) relative to the pedal base 1810 when a driver exerts a force on the foot pad 1805. In some instances, the prismatic joint 1820 is designed such that foot pad 1805 linearly travels less than 0.001-2 mm relative to the pedal base 1810, between 0.001-5 mm relative to the pedal base 1810, or some other distance range relative to the pedal base 1810 when a driver exerts a force on the foot pad 1805.

In the foregoing specification, specific examples have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In addition, unless the context of their usage unambiguously indicates otherwise, the articles "a" and "an" should not be interpreted as meaning "one" or "only one." Rather these articles should be interpreted as meaning "at least one" or "one or more".

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

We claim:

1. A pedal assembly for a vehicle comprising:
   a foot pad;
   a pedal base;
   a flexible hinge that couples the foot pad to the pedal base, wherein the flexible hinge bends towards the pedal base when a force is exerted on the foot pad;
   a sensor assembly at least partially contained within the pedal base, the sensor assembly including a yoke, a spring, and multiple sensors configured to sense the force exerted on the foot pad; and
   an electronic processor connected to the multiple sensors, the electronic processor configured to generate an output signal for controlling the vehicle based on a signal generated by each of the multiple sensors and a model that defines a mechanical hysteresis effect;
   wherein the multiple sensors include a first strain gauge sensor and a second strain gauge sensor.

2. The pedal assembly of claim 1, wherein the flexible hinge is a copolymer.

3. The pedal assembly of claim 1, wherein the flexible hinge is designed so that the foot pad travels between 0.001 mm to 2 mm relative to the pedal base when a driver exerts a force on the foot pad.

4. The pedal assembly of claim 1, wherein the flexible hinge is designed so that the foot pad travels between 0.001 mm to 5 mm relative to the pedal base when a driver exerts a force on the foot pad.

5. The pedal assembly of claim 1, including a spacer.

6. The pedal assembly of claim 5, wherein the sensor assembly includes first and second actuators.

7. The pedal assembly of claim 6, wherein the spring is positioned and compressed in along a z-axis between the yoke and the first actuator.

8. The pedal assembly of claim 7, the yoke including a central locating element positioned to prevent movement of the spring in a x direction and a y direction.

9. The pedal assembly of claim 5, wherein the spacer is disposed between the first strain gauge sensor and the second strain gauge sensor.

10. A pedal assembly for a vehicle comprising:
    a foot pad;
    a pedal base;
    a prismatic joint that couples the foot pad to the pedal base, wherein the prismatic joint enables linear displacement of the foot pad relative to the pedal base when a force is exerted on the foot pad;
    a sensor configured to sense the force exerted on the foot pad; and
    an electronic processor connected to the sensor, the electronic processor configured to generate an output signal for controlling the vehicle based on a signal generated by the sensor and a model that defines a mechanical hysteresis effect.

11. The pedal assembly of claim 10, wherein the sensor includes a first strain gauge and a second strain gauge.

12. The pedal assembly of claim 10, wherein the prismatic joint includes a linear bearing that engages a protruding member extending from the foot pad.

13. The pedal assembly of claim 12, wherein the protruding member slides down the linear bearing from an idle position to an engaged position.

14. The pedal assembly of claim 13, wherein the prismatic joint includes more than one bearing spring.

15. The pedal assembly of claim 13, wherein the prismatic joint includes a bearing spring.

16. The pedal assembly of claim 15, wherein the bearing spring coaxially surrounds the linear bearing and assists with moving the foot pad from an engaged position to an idle position when the foot pad is released from a force by a driver.

17. The pedal assembly of claim 10, wherein the prismatic joint is designed so that the foot pad travels between 0.001 mm to 2 mm relative to the pedal base when a driver exerts a force on the foot pad.

18. The pedal assembly of claim 10, wherein the prismatic joint is designed so that the foot pad travels between 0.001 mm to 5 mm relative to the pedal base when a driver exerts a force on the foot pad.

* * * * *